United States Patent [19]

Klingel

[11] Patent Number: 4,698,480
[45] Date of Patent: Oct. 6, 1987

[54] COMPUTER CONTROLLED MACHINE FOR PUNCHING AND THERMAL CUTTING OF WORKPIECES

[75] Inventor: Hans Klingel, Moglingen, Fed. Rep. of Germany

[73] Assignee: Trumpf GmbH & Co., Ditzingen, Fed. Rep. of Germany

[21] Appl. No.: 714,672

[22] Filed: Mar. 21, 1985

[30] Foreign Application Priority Data

Mar. 24, 1984 [DE] Fed. Rep. of Germany ....... 3410913

[51] Int. Cl.[4] .................. B23K 26/00; B23K 26/16
[52] U.S. Cl. .................. 219/121 LG; 219/121 FS; 219/121 PC; 364/475
[58] Field of Search .............. 219/121 LG, 121 LN, 219/121 FS, 121 PC, 121 LP, 121 LQ; 364/475, 474

[56] References Cited

U.S. PATENT DOCUMENTS

| Re. 31,042 | 9/1982 | Clark et al. | 219/121 LG |
|---|---|---|---|
| 3,544,165 | 4/1967 | Snedden | 219/121 LQ X |
| 3,564,706 | 2/1971 | Klingel | 29/564 |
| 4,063,059 | 12/1977 | Brolund et al. | 219/68 |
| 4,103,414 | 8/1978 | Herb et al. | 29/568 |
| 4,201,905 | 5/1980 | Clark et al. | 219/121 LG X |
| 4,345,744 | 8/1982 | Leibinger et al. | 266/49 |
| 4,382,170 | 5/1983 | Klingel | 219/121 PP |
| 4,403,134 | 9/1983 | Klingel | 219/121 LG |
| 4,434,349 | 2/1984 | Tsuisumi | 219/121 PC X |

Primary Examiner—C. L. Albritton

[57] ABSTRACT

A computer controlled machine performs punching and thermal cutting of workpieces at the same work station in the machine. First tool mounting means is provided on the ram assembly of the punch head and supports a punch for reciprocation by the ram member. Second tool mounting means is provided on the base of the machine for supporting a die in coaxial alignment with the punch. The machine includes thermal cutting means including power generating means, a thermal cutting head mountable in one of the tool mounting means with its cutting axis aligned with the axis of reciprocation of the ram member, and conduit means for coupling the head to the power generating means. Waste removal means is provided for mounting in the other of the tool mounting means. Computer control means will selectively and alternately operate the drive means for the ram member and the thermal cutting means, as well as move the workpiece along X and Y axes relative to the work station at which both are selectively operable. The thermal cutting means may be a laser cutting head utilizing oxygen assist for the cutting operation, or it may be a plasma cutting head. The cutting heads and cooperating waste collection devices may be stored in an automatic tool changing device for automatic insertion into the tool mounting means in response to commands from the computer control.

31 Claims, 27 Drawing Figures

COMPUTER CONTROLLED MACHINE FOR PUNCHING AND THERMAL CUTTING OF WORKPIECES

BACKGROUND OF THE INVENTION

The present invention relates to machine tools for alternately punching and thermally cutting a sheet-like workpiece, and especially those devices which are automatically controlled as to much of their operations by a computer control with the workpiece being moved relative to a work station by a workpiece clamping and guidance system.

Various machine tools have been proposed for performing machining, punching, stamping, bending and other functions upon sheet metal workpieces. Of recent years, the usage of computer numerically controlled workpiece guidance systems to move the workpiece relative to a work station on such machines has become highly advantageous. Because of the cost of accurate guidance systems for moving the workpiece and of the computer controls, it has been recognized as desirable to provide multiple functions in a single machine tool so as to utilize these two expensive components in the course of performing different functions upon the workpiece.

It is known that it may be desirable to perform both thermal cutting and punching of a sheet metal workpiece in a single machine in order to achieve this beneficial result. In Brolund et al. U.S. Pat. No. 4,063,059 granted Dec. 13, 1977, there is disclosed a punch press which additionally incorporates a plasma cutting head at a position to one side of the punching head, and the workpiece is moved for working between the punching station and the thermal cutting station. In Clark et al. U.S. Pat. No. Re. 31,042 granted on Sept. 28, 1982, there is disclosed a machine having a punching station and a laser cutting head disposed at a position to one side of the punch head and the workpiece is moved between the punching and thermal cutting stations by the guidance system. Although in theory it would be possible to perform punching and thermal cutting operations simultaneously in these two machines in view of the fact that the work stations are offset, in practice this has not been feasible. Thus, the machine is selectively performing either punching or thermal cutting with the workpiece being shifted between the two workstations depending upon the function to be performed at any given time.

It will be appreciated that this practice requires the shifting of the workpiece from the zero position represented by the punching station to an offset position represented by the thermal cutting station. Clearly, there must be a high degree of accuracy in the guidance system and in the computer control system to insure that apertures are formed in the workpiece precisely as desired. Moreover, time is required to effect the shifting between the two stations and there is generally an increase in the cost of the machine reflected by the need to provide the separate work station for thermal cutting and programming control for a second station. A further problem may be the generation of a potential dead area, i.e., an area of the sheet which may not be available to be worked on by the machine without reorientation of the sheet within the clamping and guidance mechanism.

It is an object of the present invention to provide a novel machine tool which will provide both punching and thermal cutting at precisely the same work station.

It is also an object to provide such a machine in which the tools for punching and thermal cutting may be interchanged at the work station rapidly and effectively.

Another object is to provide such a machine in which the punching and thermal cutting tools may be automatically exchanged at the work station.

A further object is to provide such a machine which is of rugged construction and adapted to precision manufacture so as to insure highly accurate processing of workpieces.

SUMMARY OF THE INVENTION

It has now been found that the foregoing and related objects may be readily attained in a computer controlled machine for performing punching and thermal cutting of workpieces by a combination which comprises a frame having a base and a head, a ram assembly mounted on the head and including a ram member mounted for reciprocation on a vertical axis relative to the base, and drive means for the ram member to effect such reciprocation. First tool mounting means is provided on the head and includes means for supporting a punch for reciprocation with the ram member, and second tool mounting means is provided on the base for supporting a die in coaxial alignment with the axis of reciprocation of the ram member. A workpiece guidance system is provided for moving a workpiece on the base of the frame below the ram assembly and along X and Y axes.

The machine also has thermal cutting means including power generating means, a thermal cutting head mountable in one of the tool mounting means with its thermal cutting axis coaxially aligned with the axis of reciprocation of the ram member, and conduit means for coupling the head and power generating means. Also provided is waste removal means including a waste removal member mountable in the other of the tool mounting means, and computer control means for selectively and alternately operating one of (i) the drive means for the ram member to reciprocate a punch and (ii) the thermal cutting means; it also operates the guidance system to move a workpiece along the X and Y axes for operation thereon by the selected one of the ram member and thermal cutting means.

In the preferred embodiment, there is included an automatic tool changing assembly having a storage component in which are removably supported a plurality of punches and cooperating dies and at least one thermal cutting head. This tool changing assembly also includes means for automatically transferring punch and thermal cutting head tooling between the tool mounting means and the storage component, and the control means controls the operations of the tool changing assembly to effect such transferring of tooling to selectively enable punching and thermal cutting of a workpiece. In this embodiment, desirably the tool mounting means and thermal cutting head are provided with cooperating fittings to effect automatic coupling thereof to complete the conduit means to the power generating means. The tool mounting means and thermal cutting head may be provided with cooperating fittings, and the fittings on the tool mounting means may include means for reciprocation thereof to couple and uncouple the cooperating fittings, in which embodiment the control means is operative to couple and uncouple the fittings.

In accordance with a first embodiment of the invention, the thermal cutting head is a laser cutting head, and the power generating means includes a laser resonator providing a laser beam. The laser cutting head includes optical means for focusing the laser beam onto a workpiece, and the conduit means includes a laser beam optical transmission pathway. Desirably, the power generating means includes a source of oxidizing gas and the conduit means includes a conduit from the oxidizing gas source to the laser cutting head. Preferably, the tool mounting means for the laser cutting head is the first tool mounting means. The optical transmission pathway may be provided in part by a passage extending vertically in the ram member to the lower end thereof, or it may extend least in part below the head of the frame and be directed laterally into the laser cutting head. In the latter embodiment, the optical means may include a mirror and a lens cooperating to change the direction of a generally laterally extending laser beam to vertical and to focus the beam onto a workpiece, or it may comprise a parabolic mirror.

In another embodiment, the thermal cutting means is a plasma cutting head, and the power generating means includes a source of high voltage electrical energy and a source of gas to be ionized by the electrical energy. The conduit means includes a high voltage transmission conduit and a gas conduit. Preferably, the machine includes a source of water and conduit means for coupling between the water source and plasma cutting head. In such a water cooling cutting operation, the machine desirably includes means for removing water from the surface of the workpiece, and these desirably include intakes on the plasma cutting head and conduit means extending from the head to a discharge point.

Preferably, the plasma cutting head is mountable in the one first tool mounting means. The conduits may in part extend vertically through passages in the ram member and thence into the plasma cutting head, or they may extend generally horizontally into the cutting head.

Preferably, the waste removal means desirably includes a conduit for transporting fumes from the thermal cutting operation to a discharge point. In such an embodiment, the receptacle and its tool mounting means have cooperating fittings to effect automatic coupling thereof to provide the conduit means to the discharge point. The tool mounting means and receptacle may be provided with cooperating fittings, and the fittings on the tool mounting means may include means for reciprocation thereof to couple and uncouple the fittings. In such case, the control means is operative to couple and uncouple the fittings.

DETAILED DESCRIPTION OF THE ILLUSTRATED EMBODIMENTS

Figure 1:
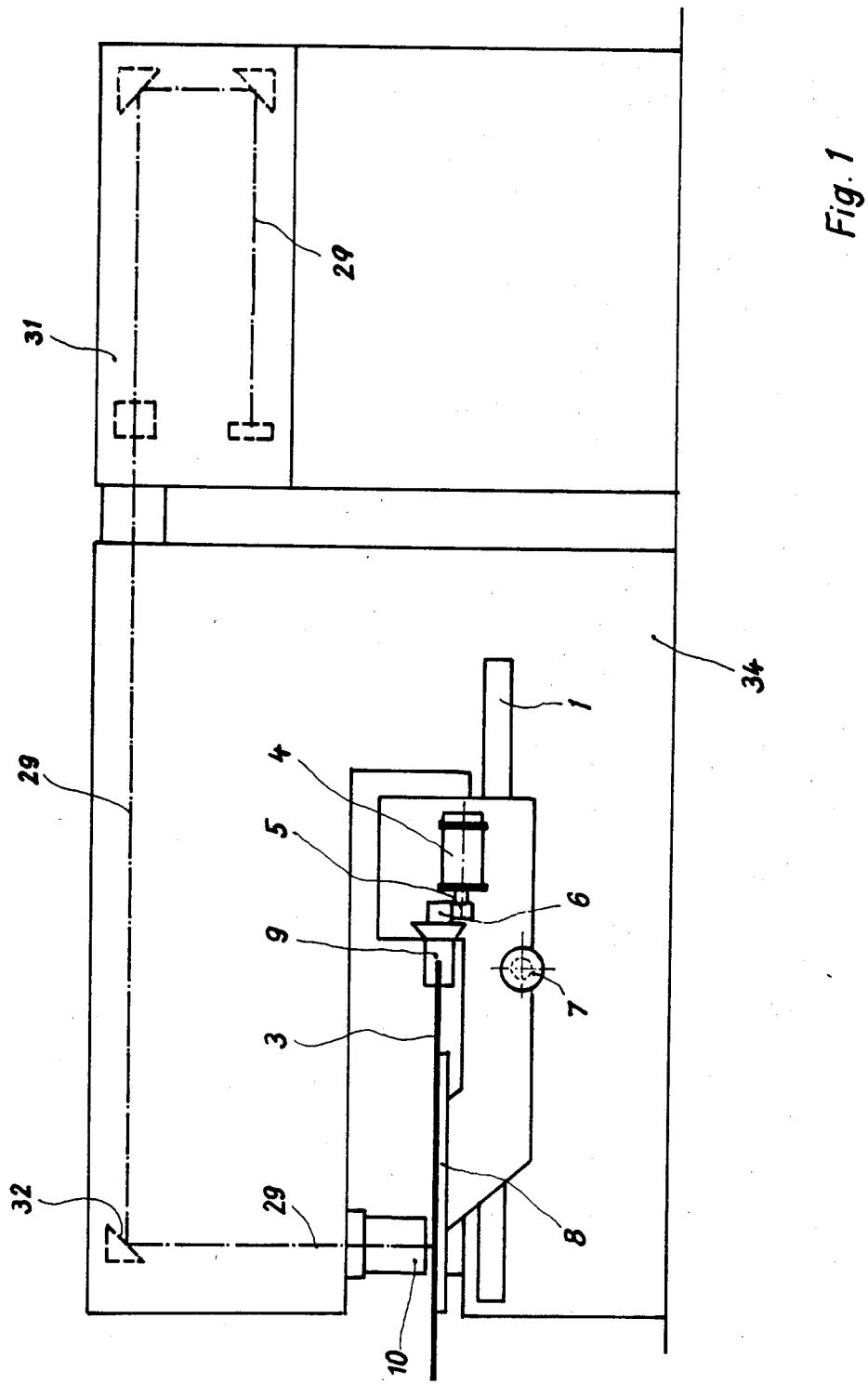
FIG. 1 is a partially schematic side elevational view of a machine tool embodying the present invention with the laser pathway and laser resonator optics illustrated in phantom line.

Turning first to FIG. 1, there is somewhat schematically illustrated a machine tool embodying the present invention which includes a machine frame 34 having thereon a table 8 for supporting the workpiece 3, and means for effecting movement of the table 8 and thereby the workpiece 3 along X and Y axes under the tool holding fixture 10 defining the work station.

More particularly, the guidance and movement system for the worktable 8 includes the longitudinal feed portion 1 which has a longitudinal rack gear (not shown) meshing with a pinion gear (not shown) driven by the motor 7. Movement of the workpiece 3 on the table 8 transversely of the machine, or in the other axis, is effected by a rack gear (not shown) on the transversely extending member 6 which meshes with the pinion gear 5 driven by the motor 4. Clamps 9, which are controlled by the computer control (not shown) are carried upon the rack member 6 and open and close to grip the workpiece 3 therein and thus support it in fixed position for purposes of the workpiece guidance system. Not illustrated is the computer control system which is operable to energize the motors 4 and 7 to effect motion of the guidance system along the X and Y axes and to open and close the clamps 9.

As previously indicated, the numeral 10 indicates the tool holding fixture or work station under which the workpiece 3 is to be moved. Also shown is a laser resonator or generator 31 with various of the optics therewithin shown in phantom line, and the laser beam 29 generated thereby is also shown in phantom line and is designated by the numeral 29. The laser beam 29 exits from the laser resonator 31 and travels horizontally along the upper portion of the machine 34 in a closed conduit to a beam bending mirror 32 which redirects the laser beam 29 downwardly through the a bore on the axis of the tool holding fixture 10 and thence onto the workpiece 3.

Also not specifically illustrated are the chiller or cooling unit which is customarily employed in connection with the laser resonator 31, the operating control station, the computer control, and other conventional components of such a computer controlled punch machine.

As will be more fully pointed out hereinafter, the machine tool of the present invention will alternately mount in the tool holding fixture 10, either conventional punch and stripping tools or a thermal cutting tool which may be a plasma cutting head or a laser cutting head.

Figure 2:
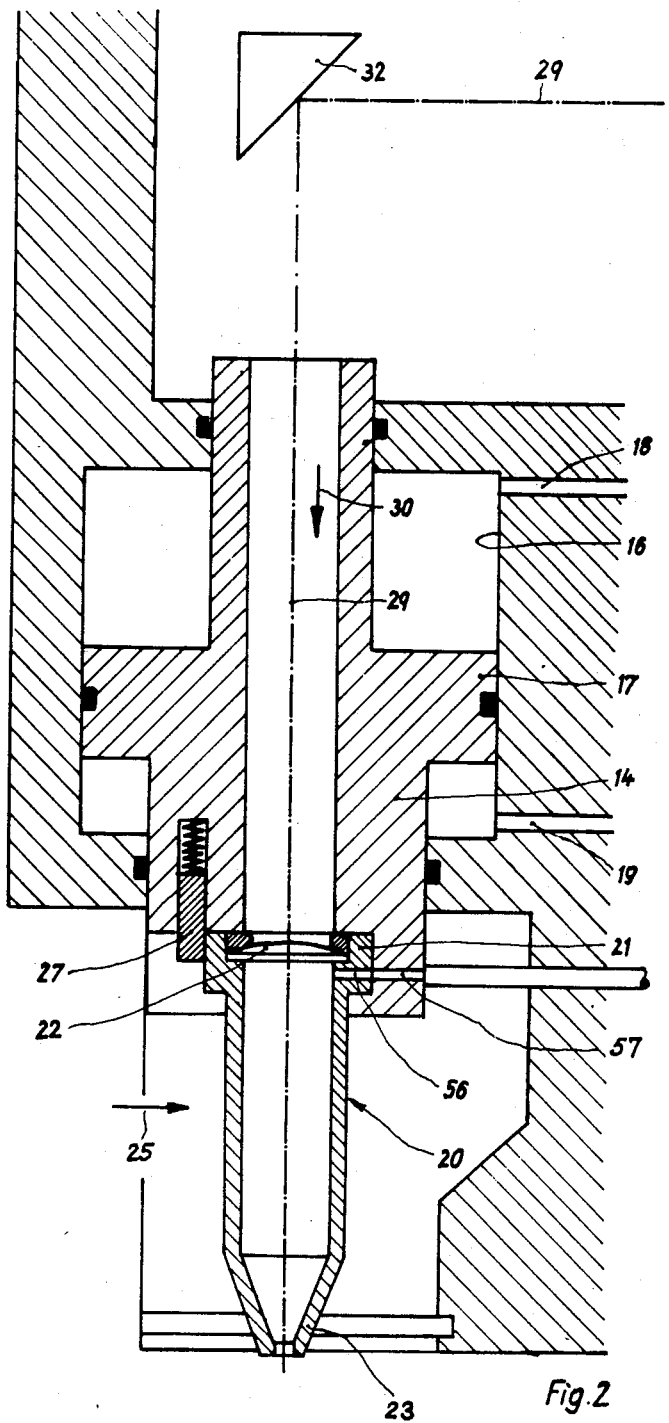
FIG. 2 is a fragmentary sectional view of the ram assembly portion of the machine of FIG. 1 drawn to a greatly enlarged scale and showing a laser cutting head mounted in the tool mounting means.

Turning next to FIG. 2, therein fragmentarily illustrated is a ram assembly utilizing hydraulic fluid to reciprocate the ram member 14 within the cavity 16 providing a cylinder in which the piston ring 17 is movable. Hydraulic fluid introduced through the conduits 18 and 19 on opposite sides of the piston ring 17 will effect the reciprocation of the ram member 14.

In this embodiment, the ram member 14 has a tool mounting portion at its lower end with a slot 26 extending thereinto to permit insertion and removal of the tools. Assembled in this tool mounting portion in FIG. 2 is a laser cutting head generally designated by the numeral 20, and it is retained in position by the spring biased clamping block 27. At its upper end, the laser cutting head 20 has a lens 22 mounted in a lens holder 21; at its lower end, the laser cutting head 20 tapers to a reduced diameter opening forming a laser cutting nozzle portion 23. Extending radially through the upper portion of the laser cutting head 20 and the ram member 14 is a conduit 57 through which an oxidizing gas such as generally oxygen may be introduced through a conduit which aligns therewith.

In this embodiment, the ram member 14 has a cylindrical bore extending therethrough, and it can be seen that the laser beam 29 is redirected by the mirror 32 so that it extends coaxially through the bore in the ram member 14, through the lens 22, and outwardly of the nozzle 23 onto the workpiece not specifically shown in FIG. 2.

Figure 3:
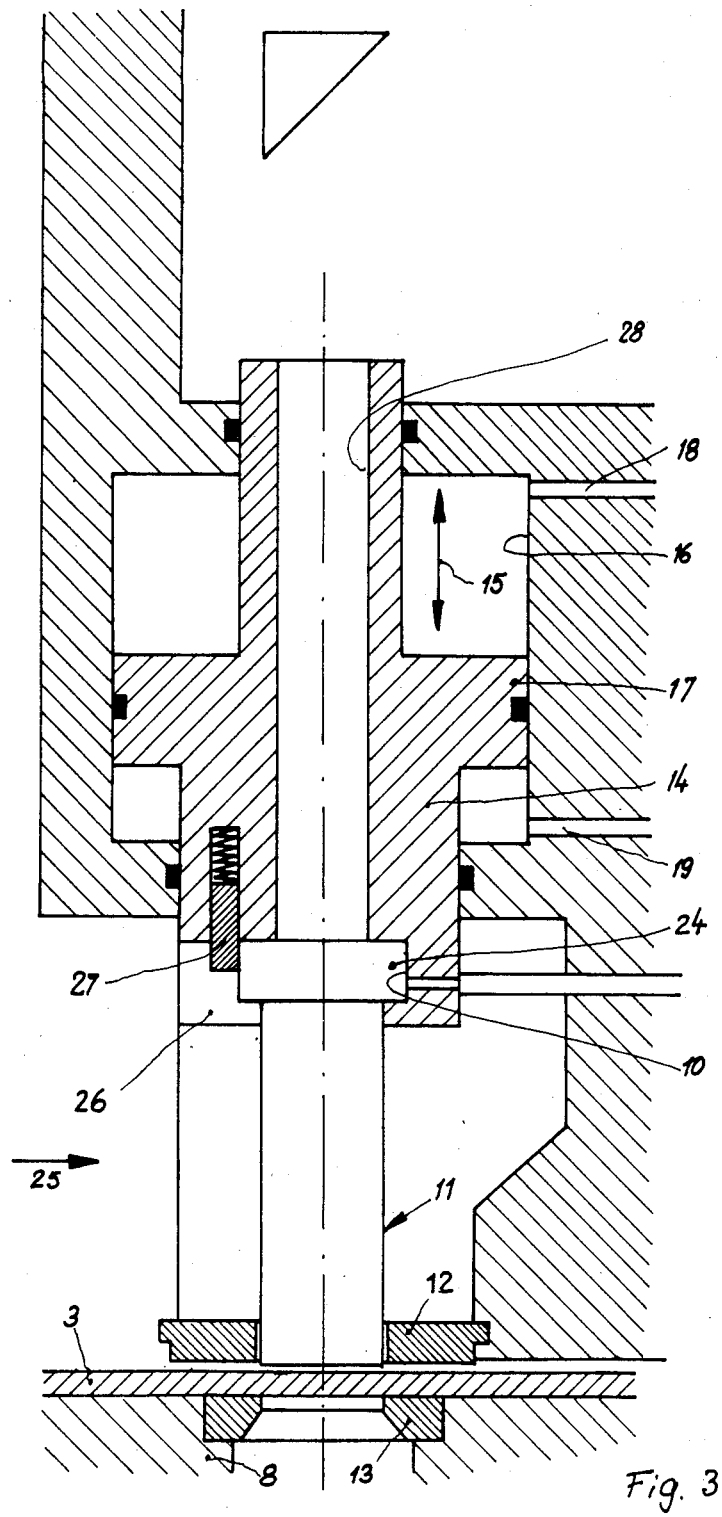
FIG. 3 is a view similar to FIG. 2 with a punch and die mounted for operation upon the workpiece and additionally illustrating the machine base, stripper die and workpiece.

Turning now to FIG. 3, the laser cutting head 20 has been removed from the tool mounting portion of the ram member 14, and a punch generally designated by the numeral 11 has its collar portion 24 disposed in the tool mounting recess. The slot in the tool mounting portion of the ram member 14 is designated by the numeral 26, and the direction of movement of the tool into the tool holding fixture 10 is indicated by the arrow 25. Also shown in FIG. 3 are a stripper 12 which is mounted in combination with the punch 11, and a cooperating die 13 which is mounted in the lower portion of the frame or table 8. As seen, a workpiece 3 is disposed between the die 13 and the punch 11. The arrow 15 indicates the reciprocation of the ram member 14 by the hydraulic fluid.

As seen in FIGS. 2 and 3, the upper portions of both the laser cutting head 20 and the punch 11 are provided with an enlarged collar to seat in the tool mounting recess in the lower portion of the ram member 14 which serves as the tool holding fixture 10. The horizontally extending slot 26 provides the area for movement of the selected tool inwardly and outwardly of the tool mounting fixture 10, and clamping is effected by the clamping block 27 which is spring loaded to retain the tool in the tool mounting fixture 10, but can be moved upwardly against the force of the spring manually or by means of a cartridge or tool changing mechanism utilized to insert and remove the tools from the tool mounting fixture 10.

Figure 4:
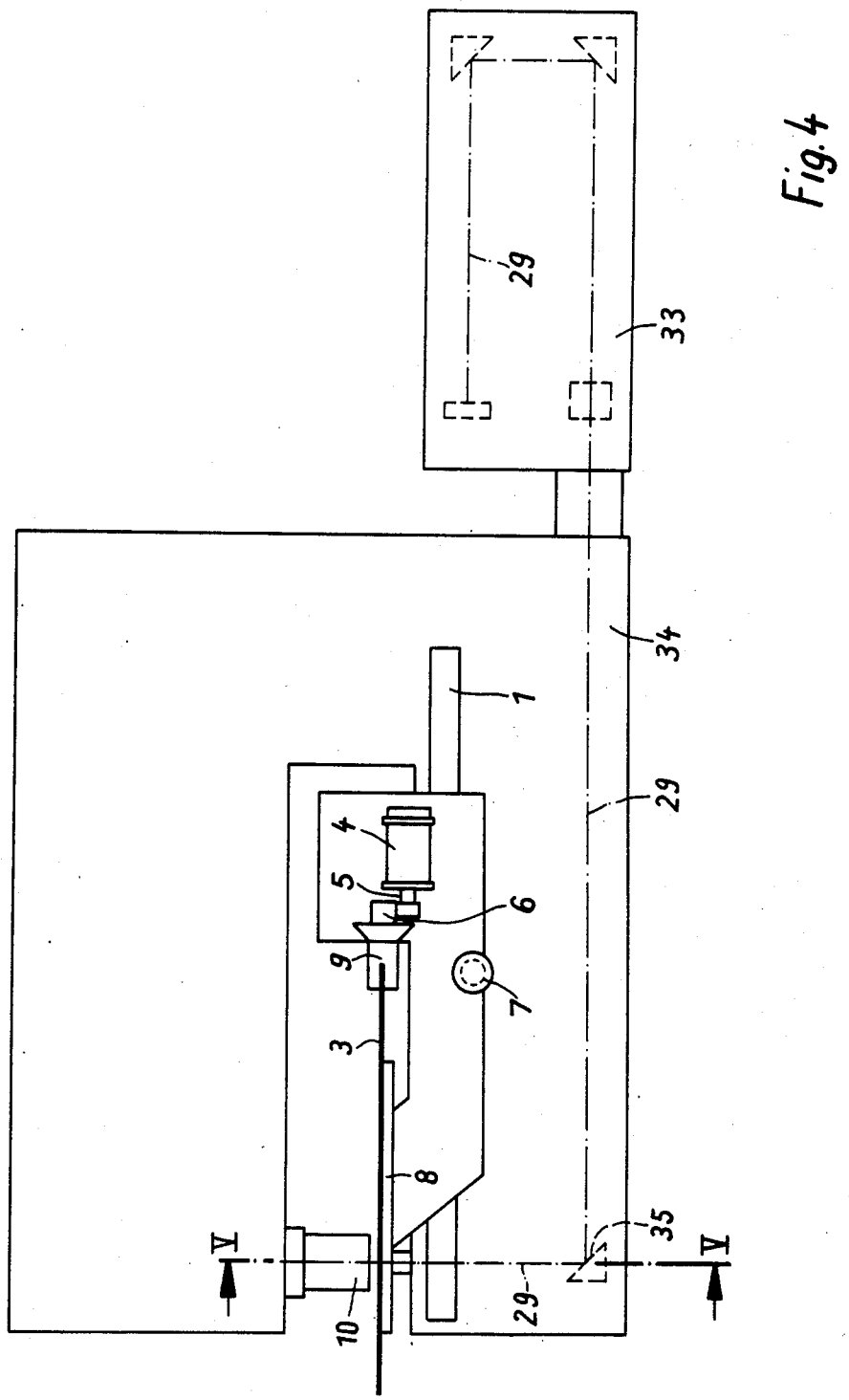
FIG. 4 is a partially diagrammatic side elevational view of a machine tool representing an alternate embodiment of the present invention with the laser pathway and laser optics in the resonator indicated in phantom line.

Turning now to FIG. 4, therein illustrated is another embodiment of the machine wherein the laser resonator 33 has the beam 29 exit therefrom and extend along the bottom of the machine 34 to the beam bending mirror 35 which redirects it upwardly towards the tool mounting fixture 10. In this particular embodiment, the normal punching tools operate vertically downwardly by reason of their mounting in the tool mounting fixture 10 whereas the laser cutting tool will operate vertically upwardly on the bottom surface of the workpiece 3. Thus, the ram member employed in the press may be of the conventional solid ram construction.

Figure 5:
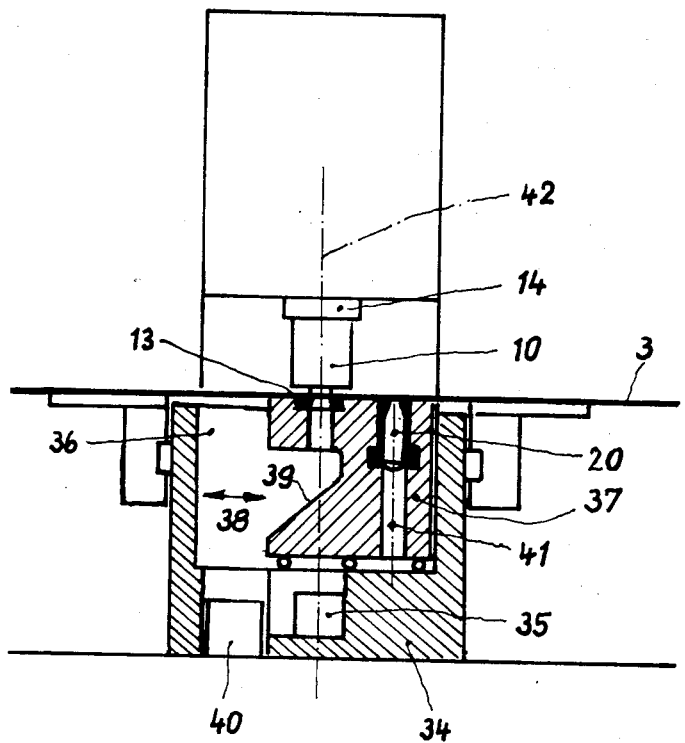
FIG. 5 is a partially sectional view of the machine tool of FIG. 4 along the line 5—5 of FIG. 4 with the carriage having moved the laser cutting head to the inoperative position.

In FIG. 5, there is illustrated one type of assembly which may be utilized in the apparatus illustrated in FIG. 4. A carriage 37 is mounted in the recess 36 formed in the base of the machine frame 34 for movement transversely of the machine frame 34 as indicated by the directional arrow 38. The position of the carriage 37 illustrated in FIG. 5 is that employed for conventional punching operations with the die 13 being aligned with a punch in the tool holding fixture 10 so that action of the ram 14 will punch the workpiece 3 with the material punched from the workpiece 3 passing downwardly through the die 13 and falling on the inclined surface 39 along which it slides into the scrap box 40.

If it is desired to effect laser cutting of the workpiece 3, the carriage 37 is shifted on its rollers to the left as seen in FIG. 5 to bring the laser cutting head 20 in coaxial alignment with the axis 42. In this position, the laser beam 29 being redirected by the mirror 35 will extend coaxially upwardly through the passage in the carriage 37 into the lens of the laser cutting head 20. The axis of the laser beam is coaxial with the axis of the laser cutting attachment 20 as indicated by the numeral 41. Not shown are the mechanisms for effecting the automatic shifting of the carriage 37 between its two extreme positions and for locking and unlocking it in the extreme positions. Also not shown are various conduits that would be utilized to provide the oxidizing gas to the laser cutting head 20 and to provide removal of fume from a cooperating waste removal means seated in the tool holder fixture 10.

Figure 6:
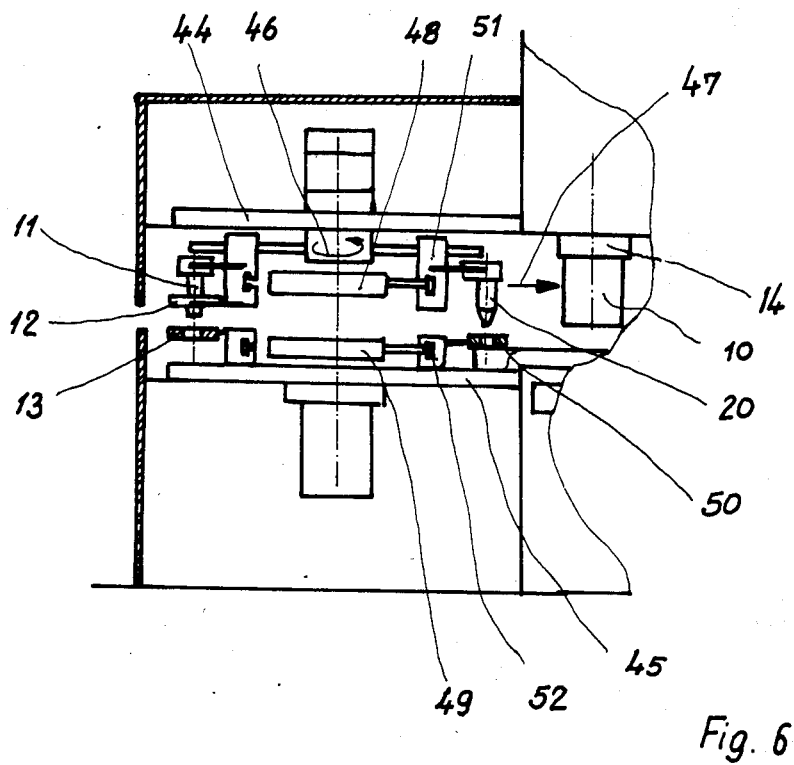
FIG. 6 is a fragmentary side elevational view in partial section of a machine tool embodying an automatic tool changing mechanism for storing, removing and inserting the selected tools in the tool mounting means of the machine.

Turning now to FIG. 6, therein illustrated is an automatic tool changing mechanism of the type illustrated and described in detail in Herb et al U.S. Pat. No. 4,103,414 granted Aug. 1, 1978. In this embodiment, the tool changing mechanism is disposed longitudinally outwardly from the wordstation and the tool holder fixture 10. The tool changing mechanism is generally designated by the numeral 43 and includes an upper support element 44 and a lower support element 45. The upper support element 44 rotatably mounts a carrier which has a multiplicity of work holding positions spaced about its periphery. At the left of the carrier as seen in FIG. 6, there is shown a punch 11 and a cooperating stripper 12; at the right there is shown a laser cutting head supported on the fixture component 51. The rotational character of the carrier is indicated by the arrow 46.

In the lower carrier, a die cooperating with the punch 11 is designated by the numeral 13 as shown on the left hand side of the figure. A fixture cooperating with the laser cutting head is designated by the numeral 50 and is shown in alignment with the laser cutting head 20. To move the tools from the carriers into the tool mounting positions at the punching station are piston/cylinder motors 48 and 49, which operate in a fashion described in detail in the foregoing Herb et al patent.

Figure 7:
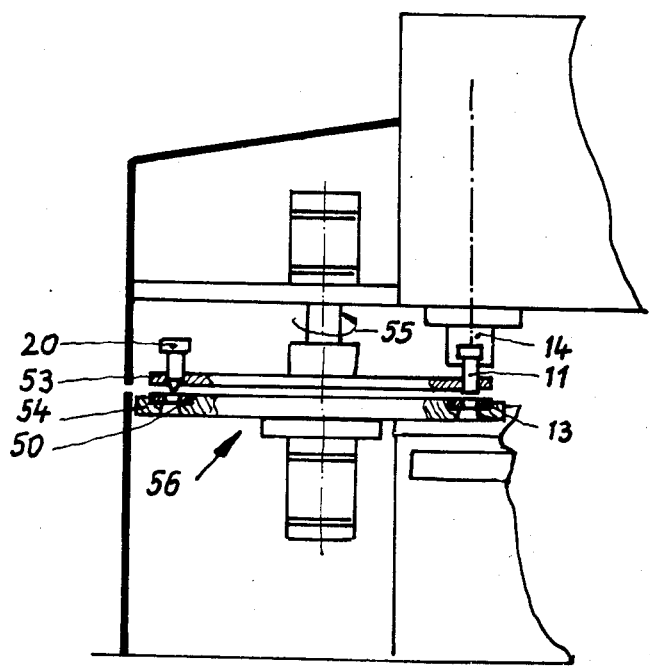
FIG. 7 is a fragmentary side elevational view in partial section showing a machine tool utilizing vertically spaced turrets for storing the tools and moving them into alignment with the work station for operation.

In FIG. 7, there is illustrated an alternate type of storage mechanism for carrying multiple tools for utilization at the work station. This turret mechanism is generally indicated by the numeral 56 and includes an upper turret member 53 and a lower turret member 54 which are synchronously rotatable by the illustrated motors and as indicated by the arrow with the numeral 55. A laser cutting head 20 is shown at the left hand side of the figure whereas a punch 11 is shown in the operative position in engagement with the ram 14. A die 13 is shown in the operative position below its cooperating punch, and a cooperating fixture for the laser cutting head 20 is in alignment therewith. As is known with respect to such turret-type mechanisms, the turret is rotated to bring the cooperating pair of tools into the work station. In the conventional punching operation, the ram will impact upon the punch and drive it against the workpiece. In a laser cutting operation, with the laser cutting head 20 in the operative position, the laser beam 29 must be directed into the laser cutting head 20, and the laser cutting head 20 must be coupled to a source of oxidizing gas such as oxygen as will be described more fully hereinafter.

Figure 8:
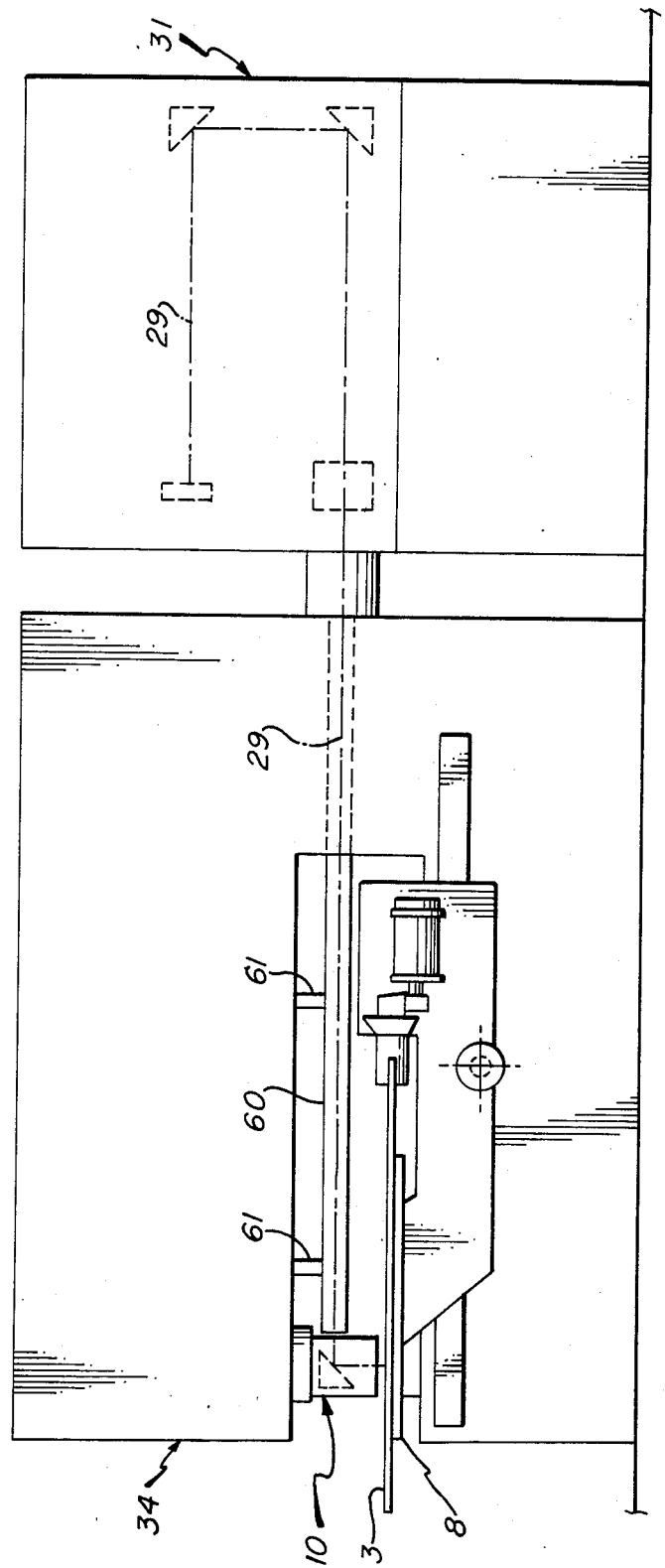
FIG. 8 is a partially schematic side elevational view of another embodiment of machine tool incorporating the present invention showing optics in the laser resonator and in the laser cutting head and the laser beam in phantom line.

Turning now to FIG. 8, therein illustrated is still another embodiment of a machine embodying the present invention in which the laser beam 29 issuing from the laser resonator 31 extends horizontally through the web of the machine frame 34 and below the head of the frame 34 so that it enters the tool holding fixture 10. The support members 61 support the laser beam enclosing tubular conduit 60 which extends from the web of the machine frame 34 to a point closely adjacent the tool mounting fixture 10. In such a construction, the ram member may be of solid construction as is conventional.

As has been indicated hereinbefore, a number of connections and control elements are necessary to operate the laser cutting head. These will be described hereinafter.

Figure 9:
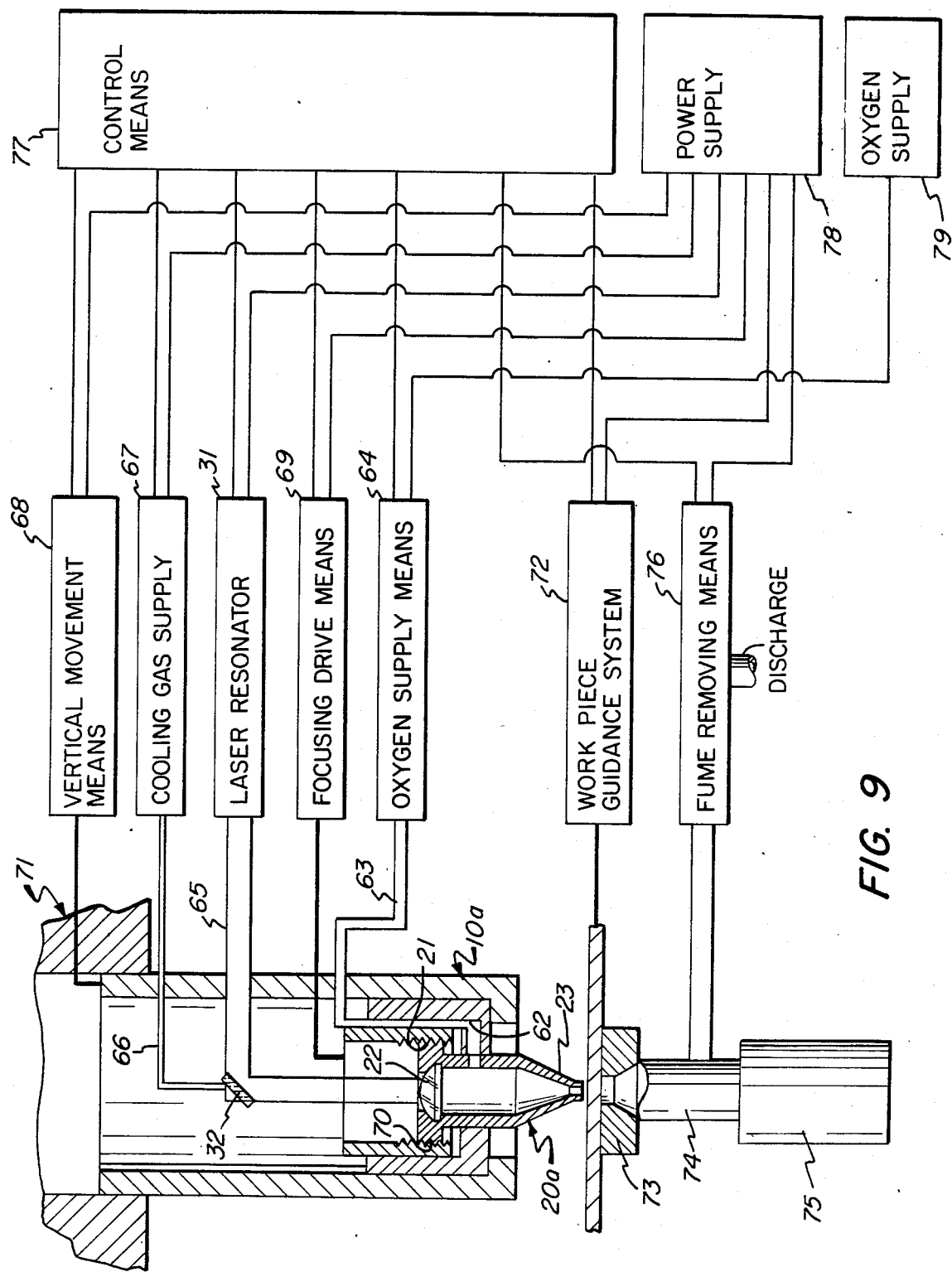
FIG. 9 is a partially schematic, fragmentary sectional view of the head and base of a punch press having mounted therein the tools for laser cutting and showing the various functional elements of the system and the connections required to effect operation thereof.

Turning now to FIG. 9, therein is schematically illustrated the working components of a laser cutting head generally designated by the numeral 20a, and its cooperating waste removal member 73. The tool mounting fixture generally designated by the numeral 10a is disposed at the lower end of the ram assembly generally designated by the numeral 71 and seats the laser cutting head 20a. As discussed previously, the laser cutting head 20a tapers to a reduced width nozzle portion 23 which is spaced closely adjacent the workpiece 3. Extending through the laser cutting head 20a is a conduit 62 through which oxygen or other oxidizing gas may be fed to impinge upon the workpiece to effect oxidation of the molten metal produced by the laser beam. In this embodiment, the upper end of the body member which also provides the nozzle portion 23 is configured to provide a lens holder 21 in which is seated the lens 22. The external collar portion about the lens holder 21 is threaded and thereby threadably supported in the focusing ring 70 which in turn is affixed to the outer shell which comprises the third structural component of the laser head 20a. The body element is secured against rotation relative to the outer shell by a pin seated in a groove (not shown), and the focusing ring 70 is free to rotate within the outer shell. As a result, when the focusing ring 70 is rotated, the body element and thereby the spacing of the lens 22 from the workpiece 3 may be varied. The drive means to effect the rotation of the focusing ring 70 is indicated schematically by the box 69 which is labelled "Focusing Drive Means" and will generally comprise a gear surface on the focusing ring, a cooperating pinion gear and a drive motor.

A conduit 63 is shown as extending from the "Oxygen Supply Means" designated by the numeral 64, and it couples to the conduit 62 within the laser cutting head 20a. The laser resonator is generally indicated by the box 31, and the laser beam transmission system for passage of the laser beam from the resonator to the beam bending mirror 32 is indicated by the number 65.

Since it is generally desirable to cool the beam bending mirror 32, a conduit 66 extends from a "Cooling Gas Supply" designated by the numeral 67 to the location of the beam bending mirror 32. In this schematic illustration, means for effecting vertical movement of the tool holding fixture 10a is indicated by the box 68. Depending upon the type of punch press employed, the gross movement of the laser cutting head 20a to permit movement of workpieces 3 beneath the laser cutting nozzle 23 without injury thereto can be effected by mounting the laser cutting head 20a in the ram 8, which can be moved upwardly, or by mounting it in the stripper mechanism which can also be moved upwardly, or by mounting it on a tool mounting fixture carried by the ram assembly and movable upwardly. As is well known, the ram member is generally moved upwardly to effect tool changing and this tool changing position will generally be sufficient to provide the necessary spacing for the workpieces to be moved inwardly and outwardly relative to the work station.

The workpiece 3 is movable by the workpiece guidance system generally designated by the block 72. A cooperating fixture for waste removal is designated by the numeral 73 and a conduit 74 extends downwardly therefrom with heavy particles falling into the collection chamber 75 and fume being drawn off by the fume removing means indicated by the numeral 76.

To effect computer control of the various operating components, lines are connected from the schematic operating components to the control means designated by the numeral 77. To provide the necessary power for operation of the various elements, lines are connected to the power supply 78. To provide this oxygen or other cutting gas to the oxygen supply means 64, a line is diagrammatically connected to the oxygen supply 79.

It will be appreciated that this schematic view is to indicate the types of connections and controls that are required for optimum operation of machines embodying the present invention when used for laser cutting. Various types of drive connections and coupling connections may be employed to achieve this result, some of which will be described more in detail hereinafter.

Figure 11:
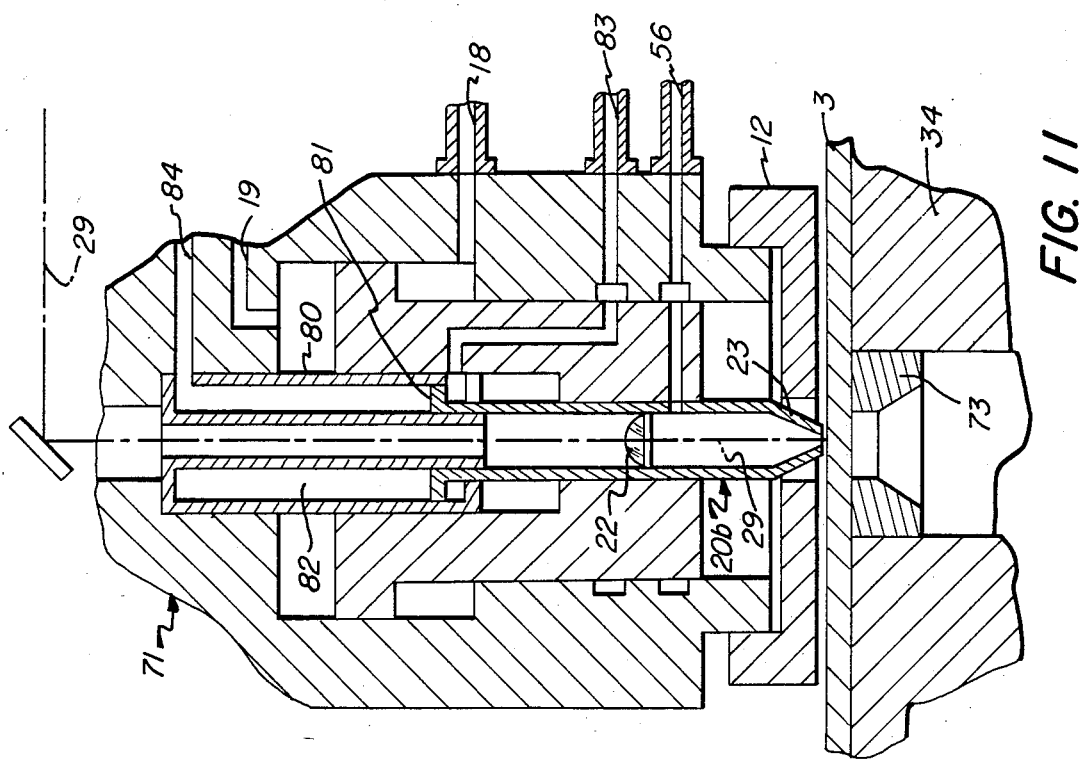
FIG. 11 is a view similar to FIG. 10 with the punch removed from the work station and the laser cutting head moved downwardly into the operative position at the work station.
Figure 10:
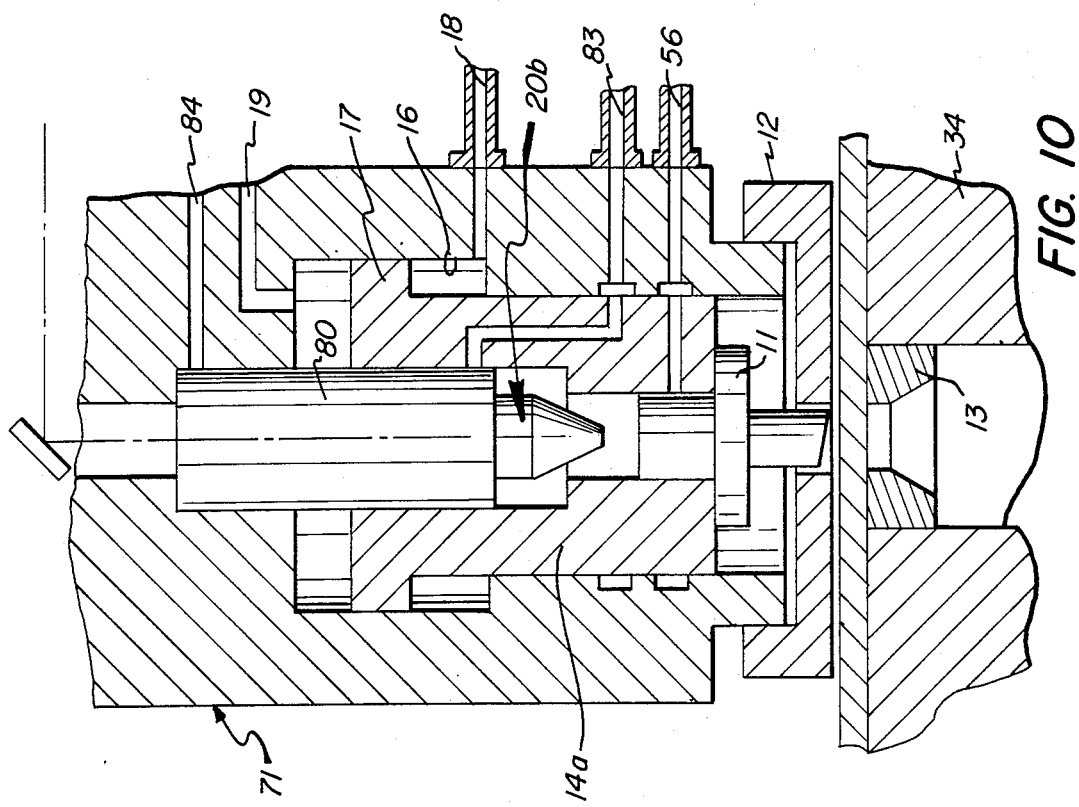
FIG. 10 is a fragmentary sectional view of the head and base of a punch press in accordance with one embodiment of the invention with a punch in the work position and a laser cutting head retracted to an inoperative position in the ram assembly.

Turning now to FIGS. 10 and 11, there is illustrated still another embodiment of the present invention wherein the laser cutting head or thermal cutting device moves between an inoperative position within the head of the machine and an operative position. As seen in FIG. 10, the hydraulically driven ram generally designated by the numeral 14a is movable upwardly and downwardly within the cylinder cavity 16 as a result of fluid entering or exiting the conduits 18 and 19. The ram member 14a has a central bore extending therethrough in which is seated the laser cutting head 20b and its housing 80, and the housing 80, also extends upwardly into a bore formed in the upper portion of the ram assembly 71. A punch 11 is shown mounted in the lower portion of the ram member 14a, and a stripper 12 is also shown in the operative position above the workpiece 3. Located in the lower portion of the frame 34 is a die 13 cooperating with the punch. Thus, in the assembly as illustrated in FIG. 10, the machine will perform conventional punching operations upon the sheet metal workpiece 3.

In FIG. 11, the punch 11 has been removed from the ram member, and the laser cutting head 20b has been moved downwardly into an operative position. As seen the laser cutting head 20b is of generally circular cross section with collar 81 at its upper end which is slidably seated and functions as a piston within the cylinder defined between the spaced circular walls of the housing 80. To effect movement of the laser cutting head 20b upwardly and downwardly within the housing 80, conduits 83 and 84 extend into the housing 80 at the upper and lower ends thereof. As a result of introduction of fluid under pressure through the conduits 83 and 84, the pressure will act upon the collar 81 to move it upwardly and downwardly as the case may be.

Also shown in this figure is the lens 22 for focusing the laser beam 29 which is directed downwardly by a beam redirecting mirror. Also shown is the conduit 56 for the introduction of oxygen or other oxidizing gas to the laser cutting head to produce the oxidation of the molten metal produced by the laser beam 29 as it impinges upon the workpiece 3. Under the workpiece 3 is a cooperating fixture 73 through which the waste and fume from the laser cutting operation will pass into the interior of the machine frame 34.

Figure 13:
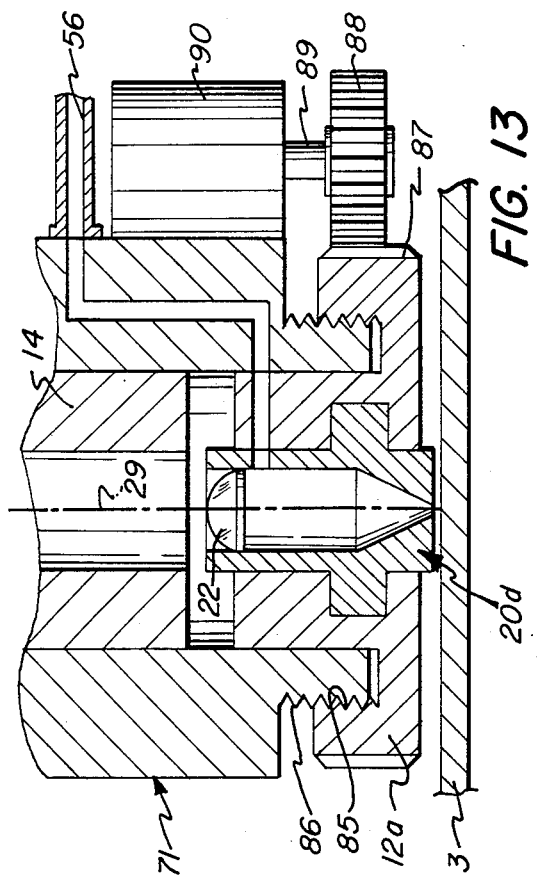
FIG. 13 is a fragmentary sectional view of the head of the machine tool showing the laser cutting head mounted in the stripper holder.
Figure 14:
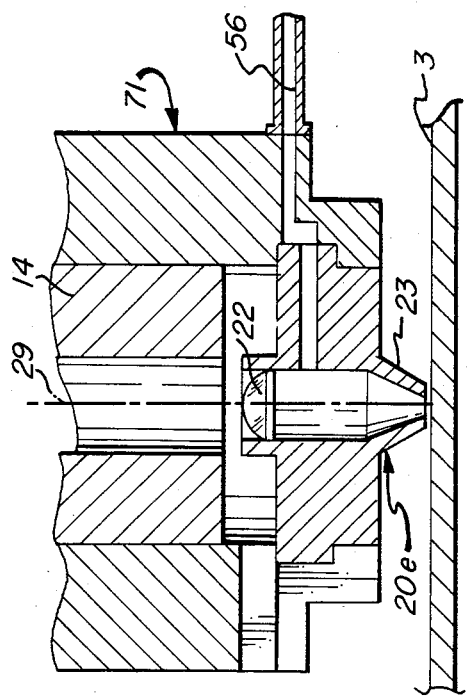
FIG. 14 is a fragmentary sectional view of the head of the machine tool showing the laser cutting head mounted in a tool mounting recess at the base of the housing of the ram assembly.
Figure 12:
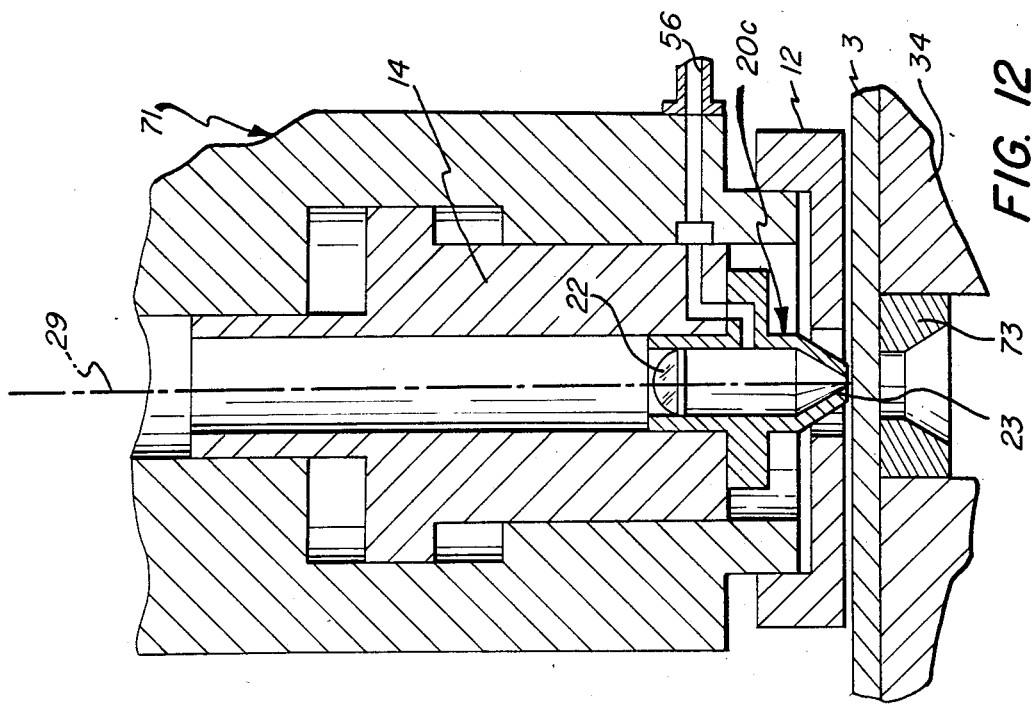
FIG. 12 is a fragmentary sectional view of the head and base of a machine embodying the present invention showing one mounting of a laser cutting head at the base of the ram member.

Turning now to FIGS. 12 through 14, therein are illustrated different arrangement for mounting the laser cutting head in the ram assembly.

In FIG. 12, the ram assembly 71 again has a hydraulically actuated ram member 14 with an axially extending bore therethrough so that the laser beam 29 extends downwardly into the laser cutting attachment generally designated by the numeral 20c. This structural assembly is similar to that illustrated in FIG. 2 in that the laser cutting head 20c mounts into a tool mounting portion formed as a part of the configuration at the lower portion of the ram member 14, i.e., a slot extending laterally thereinto, and clamping means to engage the laser cutting head 20c once it is introduced thereinto. At the upper end of the laser cutting head 20c is the focusing lens 22, and a conduit 56 extends through the side wall of the ram assembly 71 into a cooperating conduit extending first horizontally and then vertically downwardly in the ram member 14. When the laser cutting head is in position, it registers with an L-shaped conduit formed in the laser cutting head 20c.

In FIG. 13, the laser cutting head 20d is mounted in the stripper holder 12a which in turn is threadably supported at the lower end of the ram assembly 71. More particularly, the stripper holder 12a is provided with an internally threaded channel 86 which receives an externally threaded channel 86 the externally threaded flange 85 at the lower end of the ram assembly 71. It also has an external toothed portion 87 which is engageable with the pinion 88. The pinion 88 in turn is driven by the motor 90 since it is mounted upon the motor shaft 89, and rotation of the pinion 88 will produce rotation of the stripper holder 12a relative to the ram assembly 71. Thus, a limited amount of highly controllable motion vertically of the stripper holder 12a and thereby of the laser cutting head 20d can be effected through the stripper adjustment mechanism of the type which is heretofore known. In this particular embodiment, the oxygen supply conduit 56 extends through the sidewall of the ram assembly 71 and radially through the stripper holder 12a and thence through a port in the laser cutting head 20d.

Turning now to FIG. 14, the laser cutting head generally designated by the numeral 20e is insertable into a cooperatively configured recess formed in the wall at the lower end of the ram assembly 71. The conduit 56 extends horizontally through the wall of the ram assembly 71 and into the laser cutting head 20e.

Figure 15:
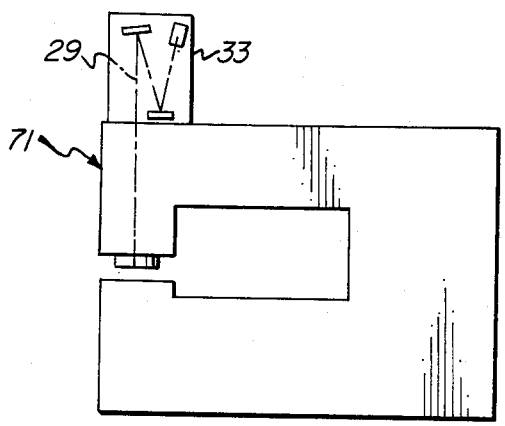
FIG. 15 is a schematic side elevational view of a machine tool showing another embodiment of the present invention wherein the laser resonator is mounted directly above the punching station and directs the laser beam vertically downwardly upon exit from its shutter, the laser beam being illustrated in phantom line.

In FIG. 15, there is illustrated diagramatically an alternate arrangement for locating the laser resonator 33 directly above the work station so that the laser beam exits the laser resonator 33 extends vertically downwardly from the shutter to the work station.

In FIG. 8, there was illustrated an embodiment of the present invention wherein the laser beam extends horizontally from the laser resonator into the tool holding assembly. Since the laser beam 29 must be changed in direction to a vertical path, it is therefore necessary to provide means for effecting such redirection. Moreover, it is still necessary to provide means for focusing the laser beam into a highly concentrated beam providing the high density energy requirements to effect melting of the workpiece.

Figure 16:
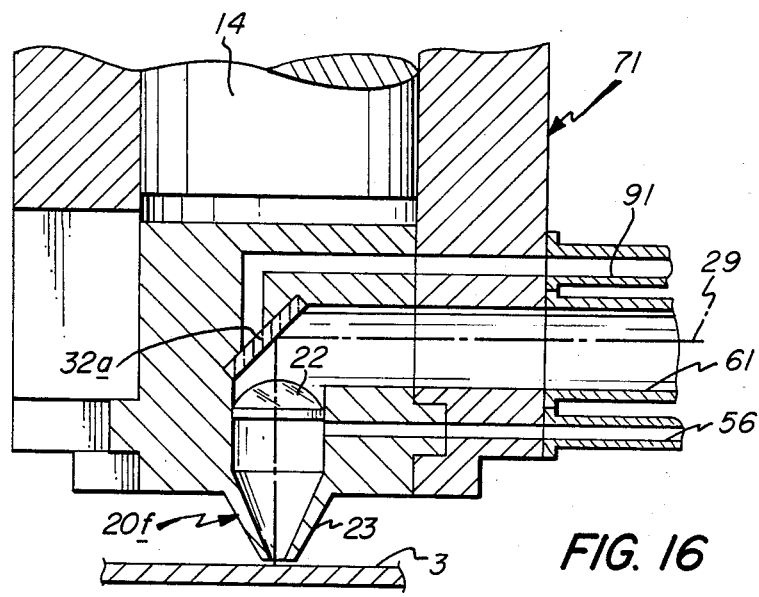
FIG. 16 is a fragmentary side elevational view of the head of a machine tool wherein the laser cutting head is mounted at the base of the housing of the ram assembly and showing one optical arrangement for redirecting and focusing a horizontally extending laser beam.

In FIG. 16, one possible arrangement is illustrated wherein the laser cutting head 20f has closely spaced along its vertical axis both the beam redirecting mirror 32a and the focusing lens 22. As the beam 29 enters the ram assembly 71 through an aperture in the side thereof, it passes through a bore in the ram assembly 20f and impinges upon the mirror 32a which changes its direction from horizontal to vertical. It then passes through the lens 22 and is focused into a small diameter spot on the workpiece 3 after it exits the nozzle 23. Cooling gas is introduced through the conduit 91 and bathes the mirror 32a to avoid undesirable effects of heat upon both the mirror and the lens which is therebelow. Oxygen or other cutting gas is introduced through the conduit 56 and exits the nozzle 23 to oxidize the metal of the workpiece 2 as it is rendered molten by the laser beam 29. To avoid contact with or injury from the laser beam 29, a tubular conduit 61 encircles its path to the ram assembly 71.

Figure 17:
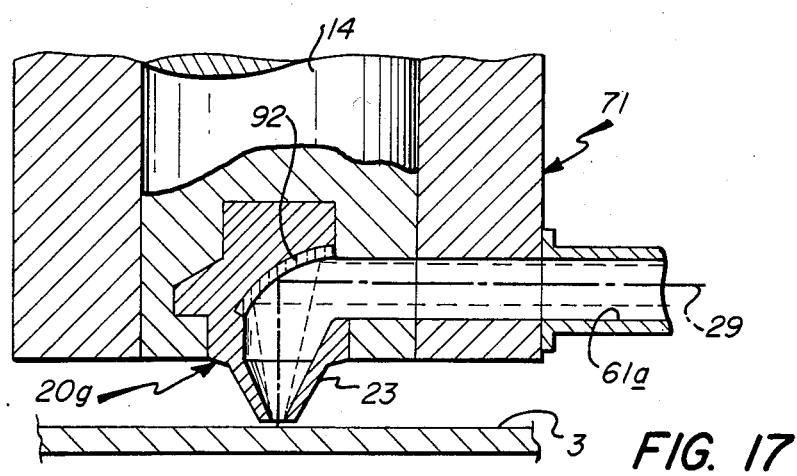
FIG. 17 is a similar view showing another optical arrangement for effecting the redirection and focusing of the laser beam.

Turning now to FIG. 17, the laser cutting head 20g is mounted in the lower portion of the ram member 14, and it employs a parabolic mirror 92 to effect both redirection of the laser beam 29 from the horizontal to the vertical as well as its focusing into a high density spot on the surface of the workpiece 3. In this embodiment, the laser beam and the oxygen for the cutting operation are both fed through the conduit 61a and the oxygen effects cooling of the parabolic mirror 92 as well as the oxidation of the metal which is render molten by the laser beam 29 as it acts upon the workpiece 3.

Figure 18:
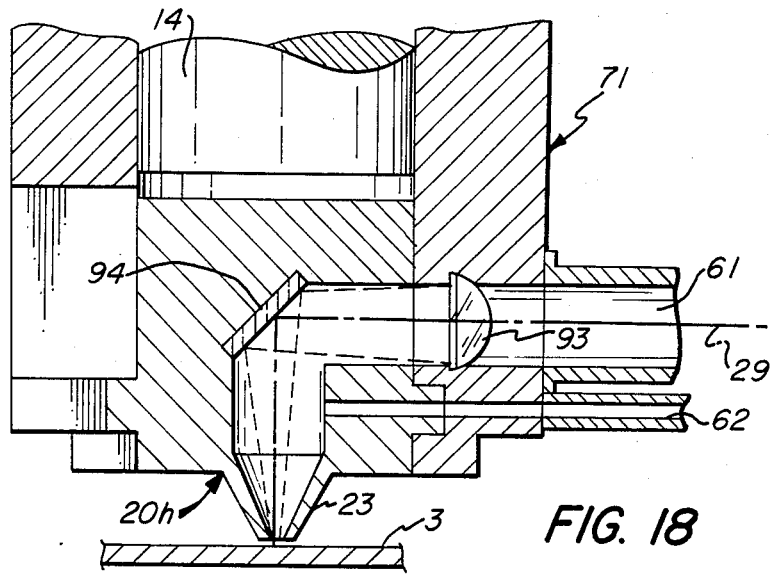
FIG. 18 is a similar view showing still another optical arrangement for effecting the redirection and focusing of the laser beam.

Turning now to FIG. 18, the laser cutting head 20h is mounted in the lower portion of the ram assembly 71 and has a mirror 94 disposed at the upper end of the vertical passage therein in a fixed position. In the side wall of the ram assembly 71 is fixedly mounted a lens 93 which partially focuses the laser beam 29 as is passes therethrough, and the partially focused beam is further focused by the angularity of the mirror 94 which also effects its reduction. In this embodiment, the conduit 62 extends through the side wall of the ram assembly 71 and through a conduit in the laser cutting head 20h to provide the oxidizing gas for the laser cutting operation.

Figure 19:
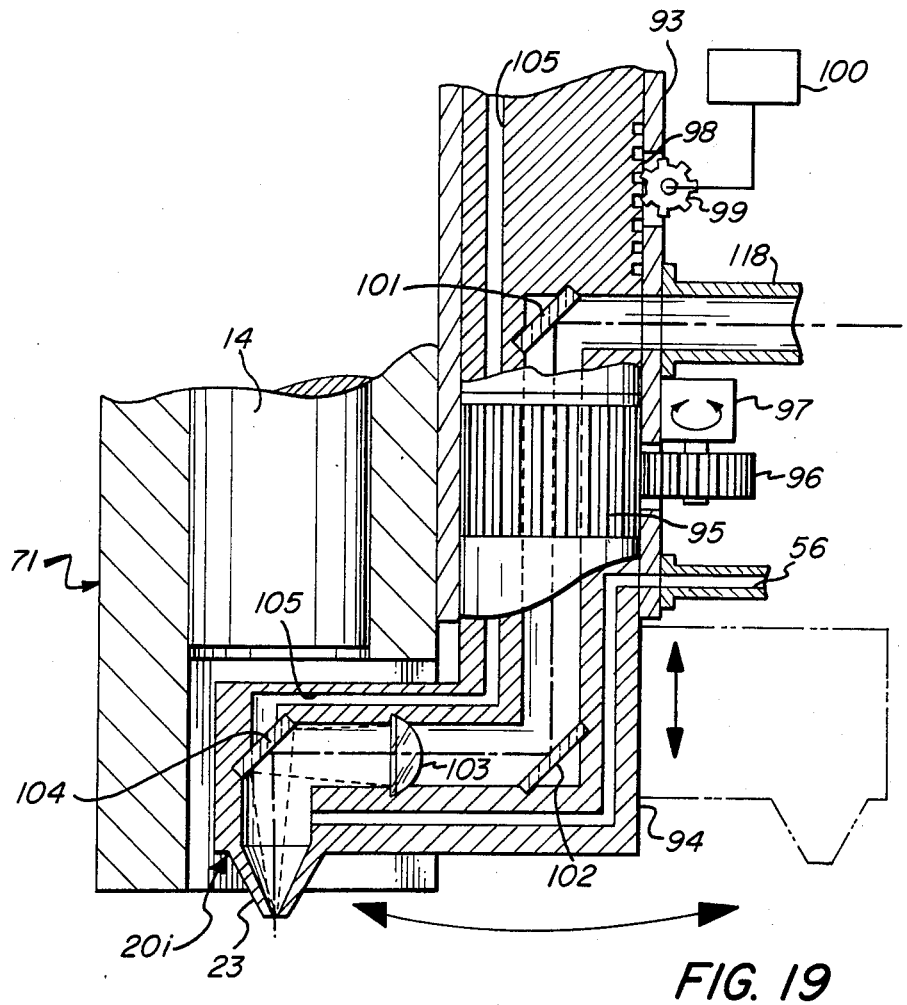
FIG. 19 is a fragmentary sectional and diagrammatic view of another embodiment of the machine wherein the laser cutting head is supported on the side of the ram assembly and is pivotable from an inoperative position into an operative position wherein its cutting axis is aligned with the ram axis, the inoperative position being indicated in phantom line.

In FIG. 19, a different type of arrangement for moving the laser cutting head into operative position is illustrated. Supported on the side of the ram assembly 71 is a tubular housing 93. Slidably and rotatably supported within the housing 93 is a generally L-shaped laser cutting head designated by the numeral 20h. As seen in FIG. 19, the laser cutting head has been rotated into its operative position wherein the cutting axis, i.e., the vertical axis of the laser beam as its exits the laser cutting head, is coaxial with that of the ram member 14. The laser beam 29 enters the upper portion of the laser cutting head 20h and is redirected vertically downwardly by the mirror 101 to the mirror 102 which effects its redirection horizontally through the lens 103 which partially focuses the laser beam 29 onto the mirror 104 which then effects its redirection and further focusing into a concentrated spot as it exists the nozzle 23.

To effect rotation from the operative position shown in full line in FIG. 19 to the phantom line position also shown, a gear surface 95 is provided along a length of the vertical portion of the tubular body 94 of the laser cutting head 20h, and a pinion gear 96 extends through an aperture in the tubular support 93 into engagement therewith. Rotation of the motor 97 thus causes rotation of the laser cutting head 20h about the axis of the vertical portion thereof as illustrated by the double headed arrow.

To effect movement of the laser cutting head vertically from a lowered position for cutting to an elevated position for storage, a rack gear 98 is provided along a portion of the length of the vertical leg of the tubular housing 94. Gear 99 extends through an aperture in the tubular support 93 and, when actuated by the motor 100, will produce a limited amount of vertical motion of the laser cutting head 20h.

Figure 20:
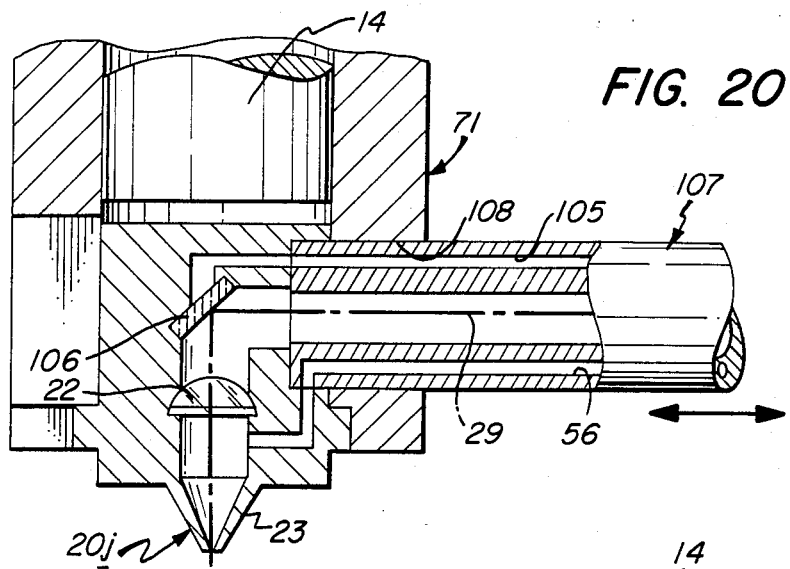
FIG. 20 is a fragmentary sectional view of the ram assembly of a machine tool embodying the present invention wherein a conduit member is reciprocatable between a position removed from the ram member and a position inserted into the ram member so as to effect connection or coupling with conduits in the laser cutting head.

Turning now to FIG. 20, there is shown one method for effecting the coupling of various conduits to the laser cutting head generally designated by the numeral 20j. As seen, the laser cutting head 20j is supported in a cooperatively configured portion at the base of the ram assembly 71 below the ram 14. The laser cutting head has a lens 22 and a beam redirecting mirror 106 thereabove. Upon movement of the laser cutting head into the tool mounting portion of the ram assembly 71, the control means effects movement of the tube 29 inwardly to seat its end within a cooperating cavity formed in the side of the laser cutting head 20j. As it does so, the conduit 56 within the tube 29 will register with a cooperating conduit within the laser cutting head 20j so that oxygen will enter the laser cutting head below the lens 22. Similarly, a conduit 105 will register with a conduit in the laser cutting head 20j to supply cooling gas to cool the mirror 106. Moreover, the enclosure for the laser beam 29 provided by the conduit 107 moves inwardly so that the user is fully protected from the laser beam 29.

Figure 21:
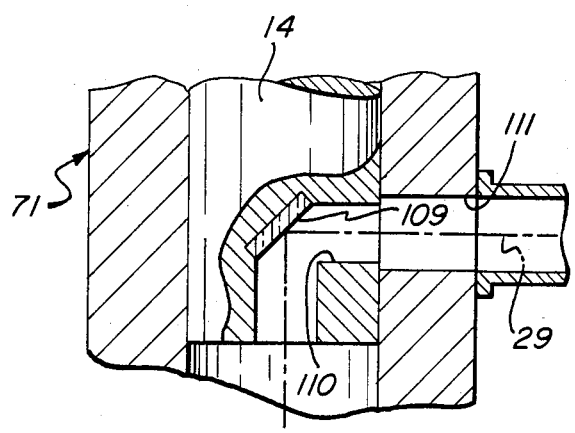
FIG. 21 is a fragmentary sectional view of the machine head with a mirror supported in a passageway in the ram member and the laser beam extending horizontally into the ram assembly for redirection vertically downwardly by the mirror.

In the embodiment of FIG. 21, the mirror 109 to effect redirection of the horizontally travelling laser beam 29 is mounted in a fixed position in the lower portion of the ram member 14. This has the advantage of providing a greater length of travel and permitting the location of the lens at the upper end of the laser cutting head to achieve optimum focusing properties. As seen, the sidewall of the ram assembly 71 has an aperture 111 which registers in the operative position of the ram member 14 in the laser cutting operation with a cooperating L-shaped passage 110 within which is seated the mirror 109.

Figure 22:
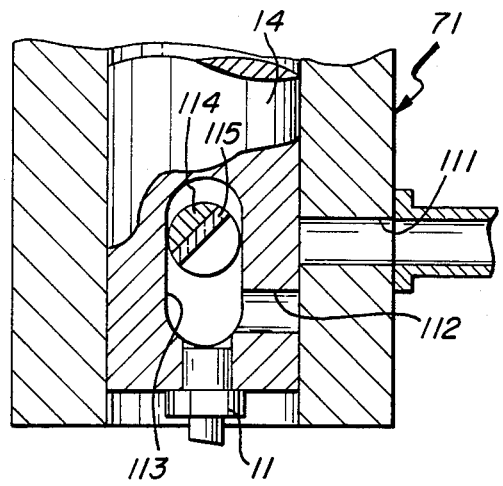
FIG. 22 is a fragmentary sectional view of another embodiment wherein the mirror is carried in fixed position within the ram housing in a vertically extending slot in the ram member, and the ram housing and ram member have apertures therein which are alignable with the mirror, a punch being disposed in the tool mounting portion of the ram assembly in this figure.
Figure 23:
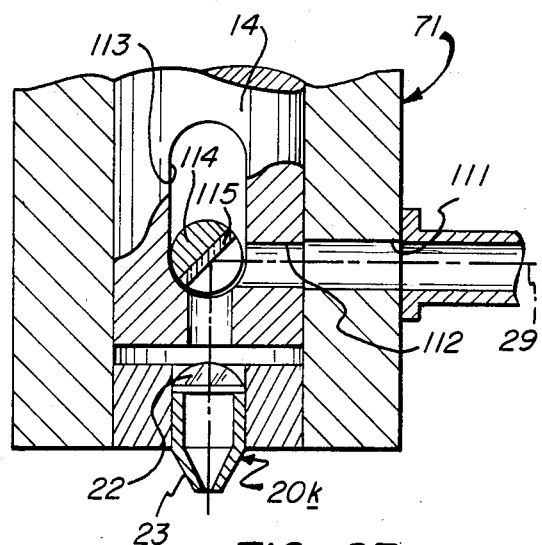
FIG. 23 is a view of the assembly of FIG. 22 with the laser beam passages aligned and a laser cutting head mounted in the ram assembly.

In FIGS. 22 and 23, another arrangement for disposing the beam redirecting mirror 115 within the area coupled by the ram member 14 is illustrated. Again the housing of the ram assembly 71 is provided with an aperture 111 in the sidewall thereof. In this embodiment, the lower portion of the ram member 14 has a vertically elongated passage 113 therein which extends diametrically thereacross. A rod 114 has its ends seated in the wall of the ram assembly 71 and has mounted thereon a beam redirecting mirror 115. Adjacent the lower end of the passage 113 is a passage 112 which extends radially though the ram member at an angle which is perpendicular to the axis of the rod 114.

In FIG. 22, a punch 11 is seated in the lower end of the ram member 14, and the ram member 14 is at its lowered position for the punching operation. In FIG. 23, the ram member 14 has been moved to its inoperative position, at which point the radial passage 112 has become aligned with passage 111 in the ram assembly housing. The laser beam 29 may now extend through the passages 111 and 112 to impinge upon the mirror 115 which will then effect its redirection downwardly into the laser cutting head generally designated by the numeral 20k, and the lens 22 will effect the focusing thereof. In this embodiment, the laser cutting head 20k is seated in a cooperatively configured portion at the lower portion of the ram assembly 71.

Figure 24:
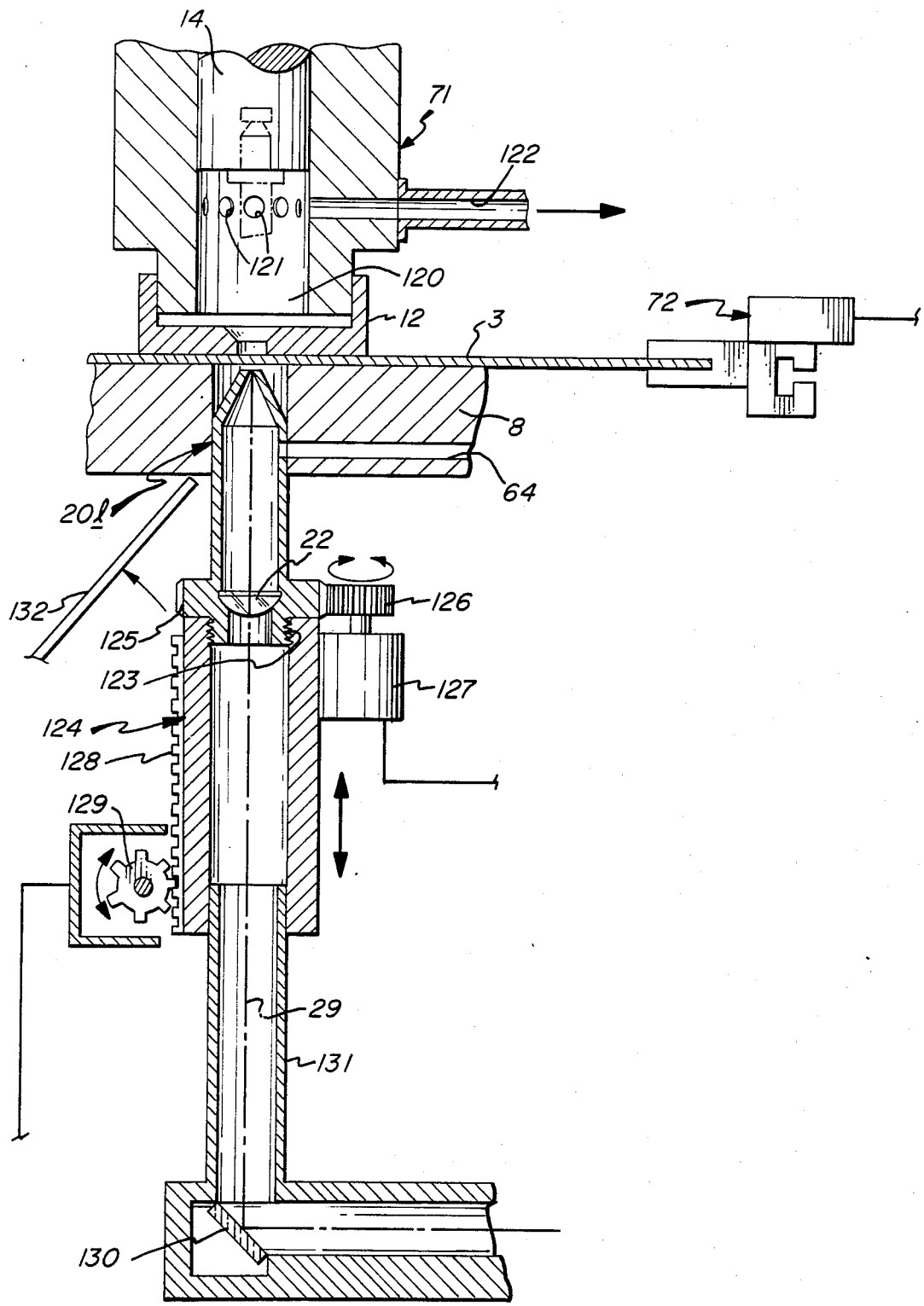
FIG. 24 is a fragmentary sectional view of the head and base of a machine utilizing another laser cutting embodiment of the present invention.
Figure 25:
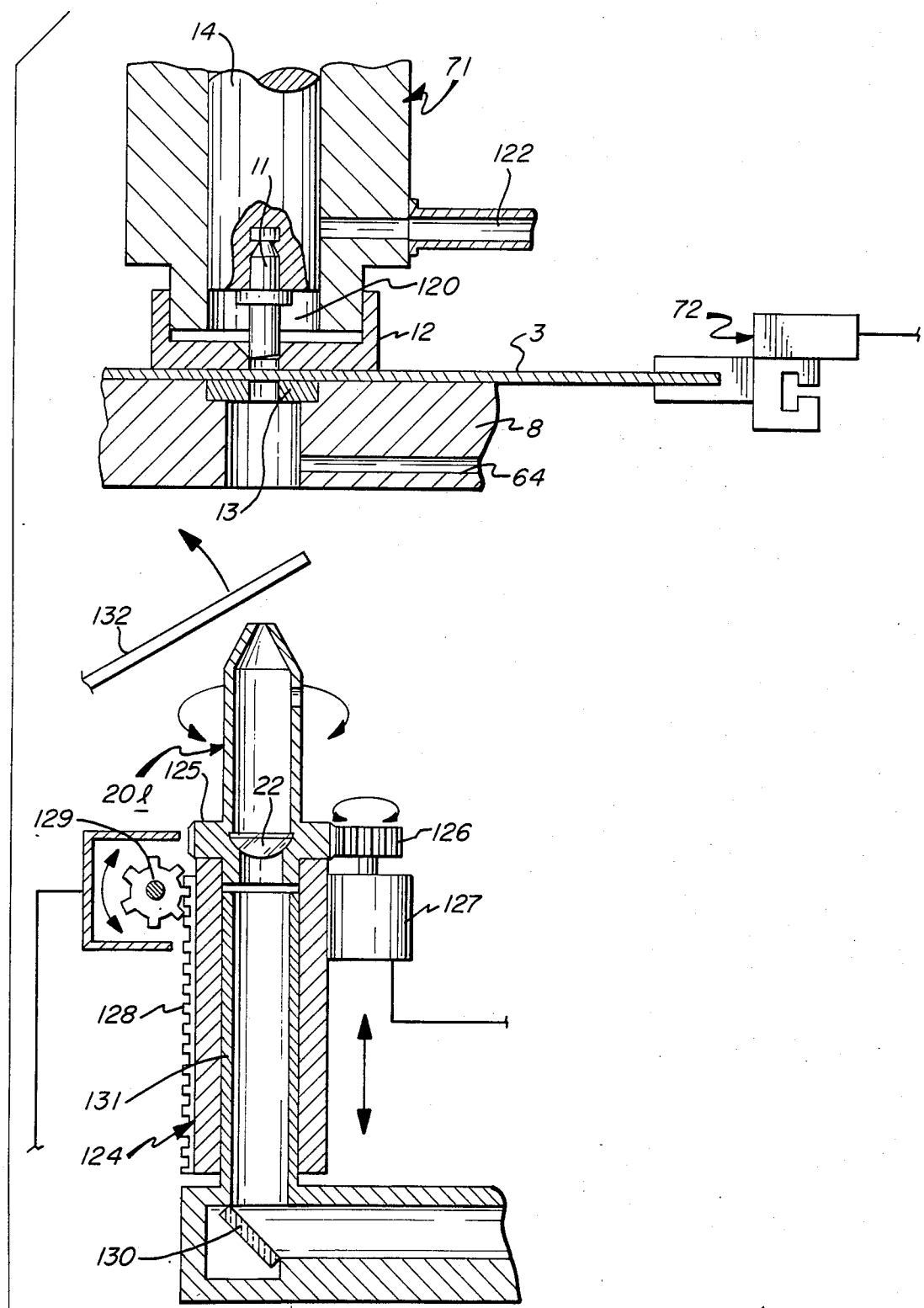
FIG. 25 is a view of the assembly of FIG. 24 with the laser cutting head moved to an inoperative position and with a conventional punch and die mounted in the work position.

In FIGS. 24 and 25 are illustrated alternate means for mounting a laser cutting head in the base of the machine as schematically illustrated in FIG. 4. In this embodiment, the ram assembly 71 has a waste removal fixture generally designated by the numeral 120 seated at the lower end of the ram member 14. It has apertures 121 which register with a vacuum conduit 122 to withdraw the fume from the laser cutting operation and discharge it through appropriate treatment means.

The laser cutting head generally designated by the numeral 201 is provided with a collar adjacent its lower end having gear teeth 125 extending therabout and an externally threaded neck portion 123 which threadably seats in the tubular support 124. The tubular support 124 in turn has a rack gear 128 along one side thereof which meshes with a pinion gear 129. Extending into the lower end of the tubular support 124 is the conduit member 131, and at the base the conduit member 131 is the beam redirecting mirror 130. The laser beam 29 horizontally until it impinges upon the beam redirecting mirror 130 at which point it is redirected upwardly through the lens 22 which focuses it upon the lower surface of the workpiece 3. To effect fine motion of the laser cutting head 201 for optimum focusing of the laser beam 29, the motor 127 may be actuated which will rotate the pinion gear 126; by reason of its threaded engagement at the neck 123, this will move the laser cutting head 201 upwardly or downwardly.

When it is desired to perform a punching operation, a motor (not shown) actuates the gear 129 which moves the support and thereby the entire laser cutting assembly downwardly to the position shown in FIG. 25. A hinged cover member 132, which was biased to the side by the laser cutting assembly during its motion upwardly, then swings downwardly into place to provide a cover over the laser cutting assembly as shown in this figure. A die 13 is introduced into the tool holding portion in the base of the machine, and a punch 11 is inserted into the lower portion of the ram member 14.

Figure 26:
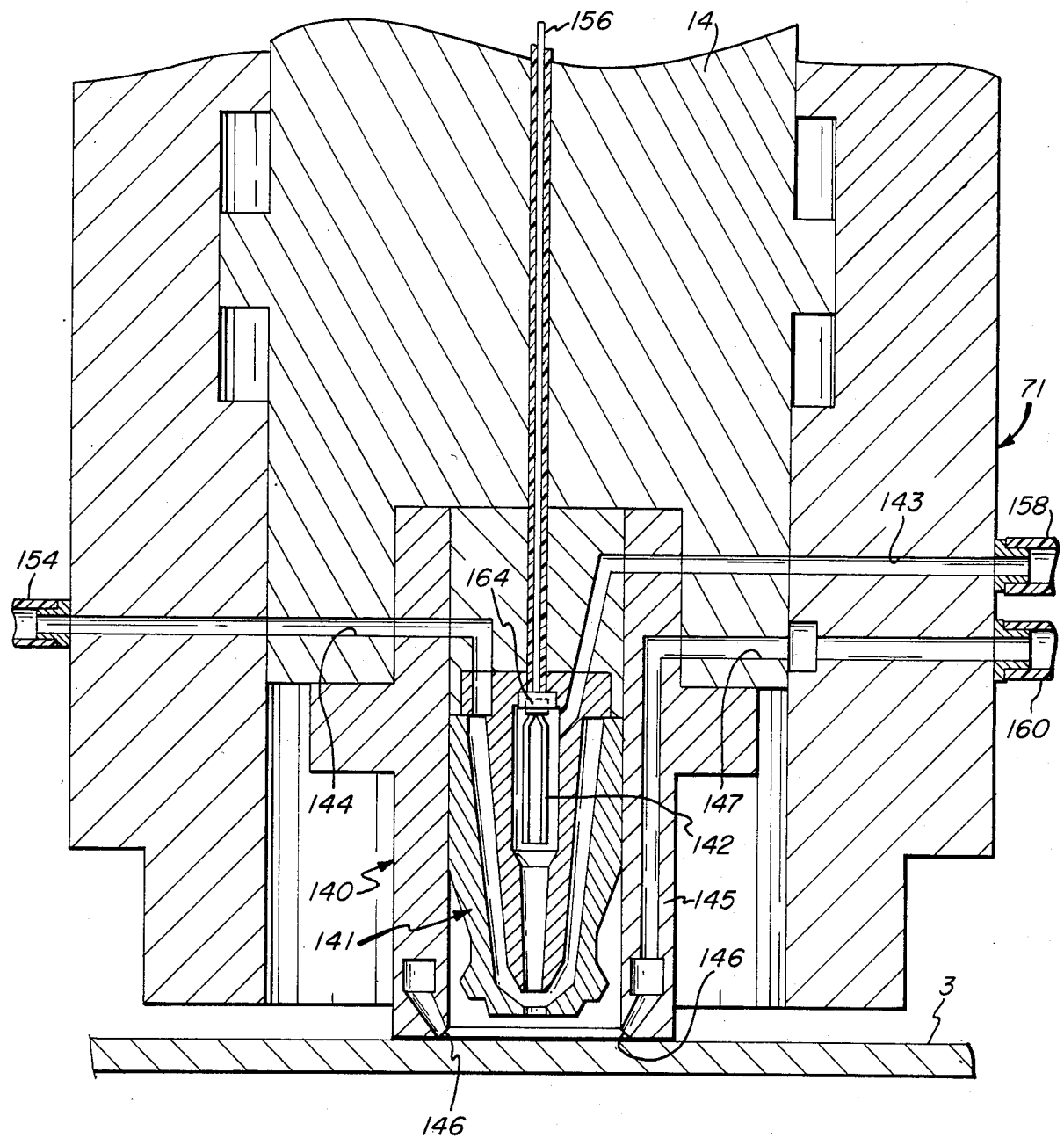
FIG. 26 is a fragmentary side elevational view of the ram assembly with a plasma cutting head mounted therein.
Figure 27:
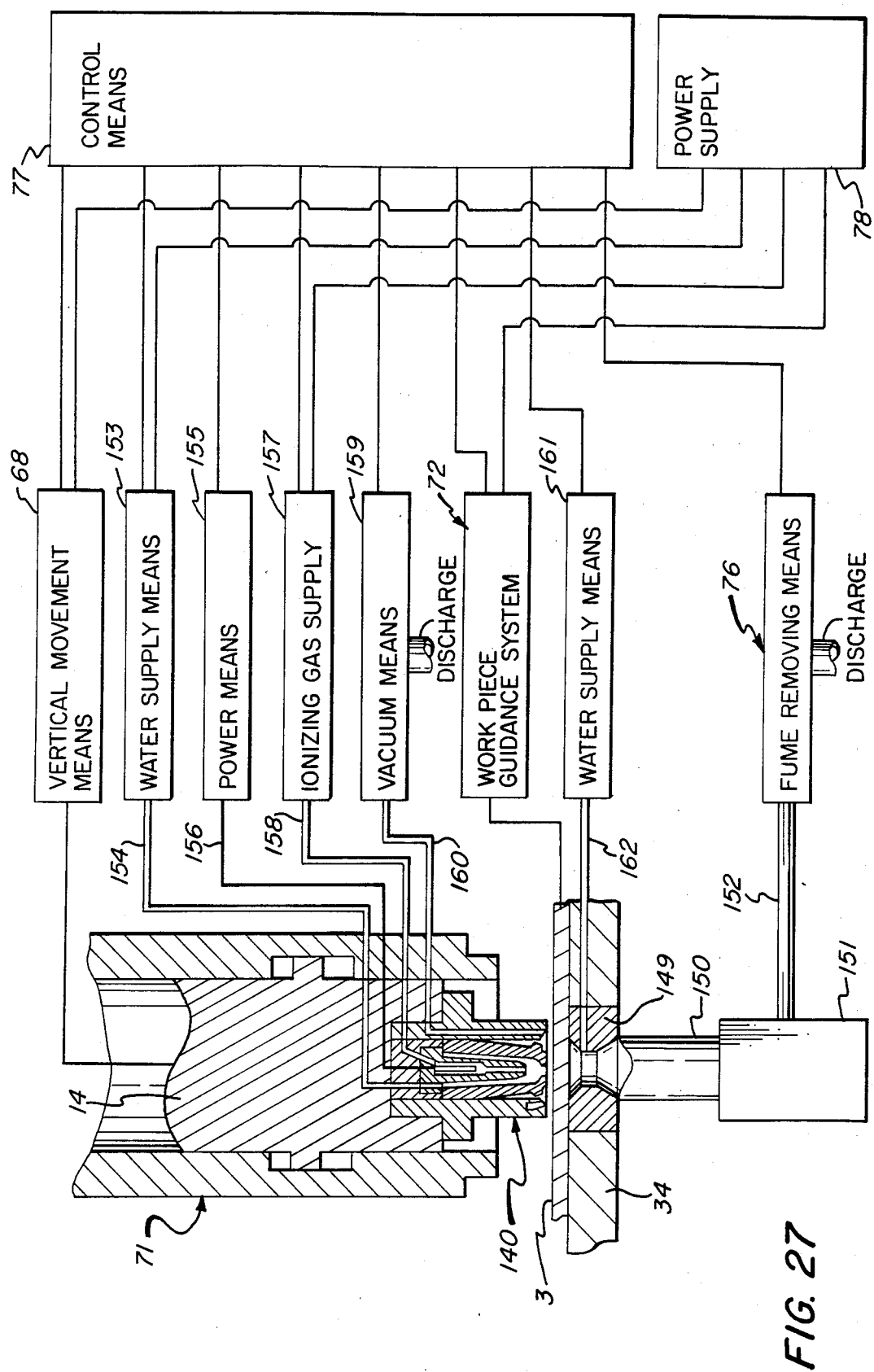
FIG. 27 is a schematic view of the plasma cutting head assembly of FIG. 26 in combination with a fragmentary portion of the machine base and waste removal means and showing the various components and conduits required for the automatic plasma cutting operation.

Turning lastly to FIGS. 26 and 27, therein illustrated are an alternate thermal cutting member, namely a plasma cutting torch, and the components required for such plasma cutting. In FIG. 26, a plasma cutting head generally designated by the numeral 140 is mounted in the tool mounting recess at the bottom of the ram member 14. The plasma cutting head includes the plasma torch portion generally designated by the numeral 141 and the outer ring or cylinder designated by the numeral 145 which also provides the mounting portion for the assembly. The outer ring 145 has vacuum pickups 146 sloping diagonally towards the center line therefrom and these communicate with the vacuum conduit 147 which extends upwardly therein.

The torch portion 141 has a generally axially extending bore opening downwardly therein in which is seated the electrode 142. An electrode connector extends upwardly from the electrode 142 to the electrode coupling 164 which in turn mates with the insulated conductor 156 extending downwardly through a bore in the ram member 14. The electrode 142 is disposed at the upper end of a cavity providing spacing thereabout and extending angularly upwardly from this cavity is a conduit 143 which then alters direction and extends horizontally outwardly through the ram member 14 and through the side wall of the housing of the ram assembly 71 to a point where it makes connection with a conduit 158. The torch member is also provided with a concentric recess spaced outwardly from the cavity containing the electrode 142, and a conduit 144 extends upwardly therefrom and then extends horizontally and radially outwardly through the ram member 14 and side wall of the ram assembly 71 until it mates with a fitting 154. In operation of the plasma torch, high voltage is supplied through the conduit 156 to the electrode 142, and gas introduced into the conduits 158 and 143 is ionized thereby to produce an extremely high temperature plasma directed at high pressure against the upper surface of the workpiece 3 by the nozzle configuration. To effect cooling of the core of the torch portion 141 and of the plasma cutting head, water introduced through the conduits 154 and 144 cools the head itself and impinges upon the workpiece 3 about the area which is being subject to the high temperature plasma, and this water is immediately drawn off the surface of the workpiece 3 and upwardly into the vacuum pickups 146 and vacuum conduits 147 and 160 by a source of vacuum connected to the conduit 160.

With reference to FIG. 28, a cooperating fixture 149 is provided in the base 34 of the machine frame and has an aperture therein which communicates with the waste conduit 150 which discharges into the waste container 151. Cooling of the fixture 149 is provided by water entering it through the conduit 162, and it flows downwardly through the conduit 150 into the waste container 151 from which it may be withdrawn and recycled as required. Fume generated by the plasma cutting operation is withdrawn from the waste receptacle 151 through the conduit 152 by the fume removing means 76 and may be passed to discharge through suitable fume treating means.

Turning more specifically to FIG. 27, therein illustrated diagrammatically are the power, control and supply means necessary for operation of the embodiment of FIGS. 27 and 28. As hereinbefore indicted, fume removing means 76 is essentially a source of negative pressure or vacuum to draw fume from the waste container, process it and then eventually discharge it. To effect cooling of the cooperating fixture 149 disposed in the base of the machine frame 34, cooling water supply means 161 is provided. To effect movement of the workpiece 3 along the X and Y axes relative to the workstation, a workpiece guidance system generally designated by the numeral 72 is provided.

To effect removal of the water used for cooling of the plasma cutting torch, a source of negative pressure or vacuum means 159 is provided and the water may be discharged as indicated.

The ionizing gas supply 157 is shown as connected to the conduit 158 and the power means 155 shown as connected through the electrical conduit 156. Water supply means to cool the torch is connected to the conduit 154. To effect the vertical motion of the plasma cutting head 140 and of the punch when it is seated in the ram 14, vertical movement means 68 is provided. The various means in turn are connected to the power supply 78 and to the control means 77 which actuates and deactuates valves, power supplies and connections as appropriate during the interchange of tooling and during the cutting and punching operations.

As will be readily appreciated from the foregoing description of the illustrated embodiments, the thermal cutting head may be mounted in the same tool holder fixture as employed for the punch, or for the stripper, or in a separately formed portion at the base of the ram assembly. Moreover, in the instance of the laser cutting embodiment, it can be provided in the base portion of the machine frame since it is possible for the laser beam to work effectively in an upward direction although this is not preferred because of the problem of exhausting waste and fume.

The laser beam may be transported horizontally to a point spaced above the laser cutting head and thence be directed downwardly. According to one embodiment, the ram member will be hollow or provide with a bore which the laser beam may extend. In another embodiment, the laser beam may enter the ram member through an aperture in the ram housing and thence be directed downwardly by a mirror carried by the ram member or effective in fixed portion with a slot therein. In still another embodiment, the laser beam may be directed horizontally into the laser cutting head, and optics are provided within to effect its change in direction as well as the focusing thereof. In still another embodiment, a lens may be provided in the sidewall of the ram assembly to at least partially focus the laser beam onto a beam redirecting mirror within the laser cutting head.

As will be appreciated, it is desirable that the thermal cutting head be vertically movable while in its mounted position so as to allow change of workpieces beneath it. In some instances, the vertical stroke of the ram member may provide the desired vertical motion for clearance when the thermal cutting head is supported thereon. In other instances, the stripper holding mechanism which is carried on the ram housing may provide the means to effect the vertical motion. In other instances, it may be desirable to provide a separate tool mounting fixture on the base of the ram assembly to effect such vertical motion to provide the necessary clearance. In still another embodiment, the entire ram assembly may be moved vertically on the machine frame to provide the necessary vertical clearance.

Although fixed focus laser cutting heads may be employed, it is generally preferable to provide means for effecting fine focusing of the laser beam through limiting vertical motion of the laser cutting head to accommodate variations in the thickness of the material comprising the workpiece. The movement means for effectin the gross vertical movement of the laser cutting head to permit the workpiece to freely move thereby during loading and unloading may also be used for this purpose, or alternate means may be employed.

As has been illustrated and described, the means for coupling the thermal cutting head to the energy source and gas sources including the electrical power pack or laser resonator, oxygen gas, and ionizing gas in the instance of the plasma torch, may be in fixed position and automatically engaged upon movement of the thermal cutting head into the tool mounting fixture. Alternatively, the control means may actuate air cylinders or other suitable means to move a portion of the conduit to engage a suitable fitting in the thermal cutting head.

Similarly, the conduits for effecting removal of waste from the cooperating fixture utilized in connection with the thermal cutting head may be coupled merely by movement into position in the fixture or by automatic coupling means.

By proper design of the thermal cutting head and the conduits, it can be seen that the thermal cutting head and the cooperating fixtures may be stored in an automatic tool changer mechanism, or in a turret mechanism, for movement into position at the work station.

Thus, it can be seen that the machine of the present invention provides both punching and thermal cutting at a single work station. Automatic interchange of tooling may be readily provided if so desired. Moreover, the components may be ruggedly fabricated to provide a durable and relatively trouble-free machine.

Having thus described the invention, what is claimed is:

1. In a computer controlled machine for performing punching and thermal cutting of workpieces, the combination comprising:
  A. a frame having a base and a head;
  B. a ram assembly mounted on said head and including a ram member mounted for reciprocation on a vertical axis relative to said base and drive means for said ram member to effect such reciprocation;
  C. first tool mounting means in said head including means for supporting a punch for reciprocation with said ram member;
  D. second tool mounting means on said base including means for supporting a die in coaxial alignment with said axis of reciprocation of said ram member, said axis of reciprocation defining the work station and said tool mounting means being coaxial therewith;
  E. a workpiece guidance system for moving a workpiece on said base of said frame below said ram assembly and along X and Y axes relative to said work station;

F. thermal cutting means including power generating means, a thermal cutting head mountable in one of said tool mounting means with its thermal cutting axis coaxially aligned with said axis of reciprocation of said ram member, and conduit means for coupling said head and power generating means;

G. waste removal means including a waste removal member mountable in the other of said tool mounting means, said machine including at last a portion of said conduit means for coupling to said thermal cutting head upon mounting in said one tool mounting means, and means for coupling said thermal cutting head and said portion of said conduit means upon such mounting; and H. computer control means for selectively and alternately operating one of (i) said drive means for said ram member to reciprocate a punch and (ii) said thermal cutting means and for operating said guidance system to move a workpiece along said X and Y axes for operation thereon by the selected one of said ram member and thermal cutting means at said work station.

2. The machine in accordance with claim 1 wherein there is included an automatic tool changing assembly having a storage component in which are removably supported a plurality of punches and cooperating dies and at least one thermal cutting head and further having means for automatically transferring punch and thermal cutting tooling between said tool mounting means and said storage component and wherein said control means controls the operations of said tool changing assembly to effect such transferring of tooling to selectively enable punching and thermal cutting of a workpiece.

3. The machine in accordance with either of claims 1 or 2 wherein said one of said tool mounting means and said thermal cutting head are provided with cooperating fittings to effect automatic coupling thereof to complete said conduit means to said power generating means and comprising said coupling means.

4. The machine in accordance wih either of claims 1 or 2 wherein said one of said tool mounting means and said thermal cutting head are provided with cooperating fittings comprising said coupling means and wherein said fittings on said tool mounting means includes means for reciprocation thereof to couple and uncouple said cooperating fittings, and said control means is operative to couple and uncouple said fittings.

5. The machine in accordance with either of claims 1 or 2 wherein said thermal cutting head is a laser cutting head and wherein said power generating means includes a laser resonator providing a laser beam, said laser cutting head including optical means for focusing the laser beam onto a workpiece, and wherein said conduit means includes a laser beam optical transmission pathway.

6. The machine in accordance with claim 5 wherein said power generating means includes a source of oxidizing gas and said conduit means includes a conduit from said oxidizing gas source to said laser cutting head.

7. The machine in accordance with claim 5 wherein said one tool mounting means is said first tool mounting means and wherein said optical transmission pathway is provided in part by a passage extending vertically in said ram member to the lower end thereof.

8. The machine in accordance with claim 5 wherein said optical transmission pathway extends at least in part below said head of said frame and is directed laterally into said laser cutting head.

9. The machine in accordance with claim 8 wherein said optical means includes a mirror and a lens cooperating to change the direction of a generally laterally extending laser beam to vertical and to focus the beam onto a workpiece.

10. The machine in accordance with claim 9 wherein said optical means comprises a parabolic mirror.

11. The machine in accordance with either of claims 1 or 2 wherein said thermal cutting means is a plasma cutting head and wherein said power generating means includes a source of high voltage electrical energy and a source of gas to be ionized by said electrical energy, and wherein said conduit means includes a high voltage transmission conduit and a gas conduit.

12. The machine in accordance with claim 11 wherein there is included a source of water and conduit means for coupling between said source of water and said plasma cutting head.

13. The machine in accordance with claim 12 wherein said machine includes means for removing water from the surface of the workpiece.

14. The machine in accordance with claims 13 wherein said water removing means includes intakes on said plasma cutting head and conduit means extending from said head to a discharge point.

15. The machine in accordance with claim 11 wherein said one tool mounting means is said first tool mounting means and wherein said conduits in part extend vertically through passages in said ram member and thence into said cutting head.

16. The machine in accordance with claim 11 wherein said conduits extend generally horizontally into said cutting head.

17. The machine in accordance with either of claims 1 or 2 wherein said waste removal means includes a conduit for transporting fumes from the thermal cutting operation to a discharge point.

18. The machine in accordance with claim 17 wherein said receptacle and said other of said tool mounting means have cooperating fittings to effect automatic coupling thereof to provide said conduit means to the discharge point.

19. The machine in accordance with claim 18 wherein said other of said tool mounting means and said receptacle are provided with cooperating fittings and wherein said fittings on said tool mounting means includes means for reciprocation thereof to couple and uncouple said fittings, and wherein said control means is operative to couple and uncouple said fittings.

20. In a computer controlled machine for performing punching and thermal cutting of workpieces, the combination comprising:

A. a frame having a base and a head;

B. a ram assembly mounted on said head and including a ram member mounted for reciprocation on a vertical axis relative to said base and drive means for said ram member to effect such reciprocation;

C. first tool mounting means in said head including means for supporting a punch for reciprocation with said ram member;

D. second tool mounting means on said base including means for supporting a die in coaxial alignment with said axis of reciprocation of said ram member, said axis of reciprocation defining the work station and said tool mounting means being coaxial therewith;

E. a workpiece guidance system for moving a workpiece on said base of said frame below said ram assembly and along X and Y axes relative to said workstation;

F. a laser cutting head mountable in said first tool mounting means with its cutting axis coaxially aligned with said axis of reciprocation of said ram member, and having focusing means therein to focus the laser beam onto a workpiece;

G. waste removal means including a waste removal member mountable in said second tool mounting means;

H. a laser resonator for generating a laser beam;

I. laser beam transmission pathway means for transmitting the laser beam from said laser resonator to said focusing means of said laser cutting head upon mounting thereof in said first mounting means, at least a portion of said pathway means to direct the laser beam into said laser cutting head being disposed on said machine; and J. computer control means for selectively and alternately operating one of (i) said drive means for said ram member to reciprocate a punch and (ii) said laser cutting head means and said laser resonator, and for operating said guidance system to move a workpiece along said X and Y axes for operation thereon by the selected one of said ram member and laser cutting means at said work station.

21. The machine in accordance wih claim 1 wherein there is included an automatic tool changing assembly having a storage component in which are removably supported a plurality of punches and cooperating dies and a laser cutting head and further having means for automatically transferring punch and thermal cutting tooling between said tool mounting means and said storage component and wherein said control means controls the operations of said tool changing assembly to effect such transferring of tooling to selectively enable punching and laser cutting of a workpiece.

22. The machine in accordance with either of claims 20 or 21 wherein there is included a source of oxidizing gas and a conduit from said oxidizing gas source to said laser cutting head.

23. The machine in accordance with either of claims 20 or 21 wherein said laser beam transmission pathway means is provided in part by a passage extending vertically in said ram member to the lower end thereof.

24. The machine in accordance with either of claims 20 or 21 wherein said laser beam transmission pathway means extends at least in part below said head of said frame and is directed laterally into said laser cutting head.

25. The machine in accordance wih either of claims 20 or 21 wherein said waste removal means includes a conduit for transporting fumes from the laser cutting operation to a discharge point.

26. The machine in accordance wih claim 25 wherein said receptacle and said other of said tool mounting means have cooperating fittings to effect coupling thereof to provide said conduit means to the discharge point.

27. In a computer controlled machine for performing punching and thermal cutting of workpieces, the combination comprising:

A. a frame having a base and a head;

B. a ram assembly mounted on said head and including a ram member mounted for reciprocation on a vertical axis relative to said base and drive means for said ram member to effect such reciprocation;

C. first tool mounting means in said head including means for supporting a punch for reciprocation with said ram member;

D. second tool mounting means on said base including means for supporting a die in coaxial alignment with said axis of reciprocation of said ram member, said axis of reciprocation defining the work station and said tool mounting means being coaxial therewith;

E. a workpiece guidance system for moving a workpiece on said base of said frame below said ram assembly and along X and Y axes relative to said work station;

F. a plasma cutting head mountable in said first tool mounting means with its cutting axis coaxially aligned with said axis of reciprocation of said ram member, and conduit means for coupling said head and power generating means;

G. a source of gas to be ionized in said cutting head;

H. a source of high voltage energy to ionize gas in said cutting head;

I. conduit means for coupling said cutting head with said gas source and said high voltage source upon mounting thereof in said first mounting means, at least a portion of said conduit means being disposed on said machine, and fitting means for coupling said portion of said conduit means to said plasma cutting head upon mounting thereof in said first mounting means;

J. waste removal means including a waste removal member mountable in said second tool mounting means; and K. computer control means for selectively and alternately operating one of (i) said drive means for said ram member to reciprocate a punch and (ii) said plasma cutting head and for operating said guidance system to move a workpiece along sais X and Y axes for operation thereon by the selected one of said ram member and plasma cutting head, and for operating said high voltage source and gas source to produce a gas plasma at said plasma cutting head at said work station.

28. The machine in accordance with claim 27 wherein there is included an automatic tool changing assembly having a storage component in which are removably supported a plurality of punches and cooperating dies and a plasma cutting head and further having means for automatically transferring punch and thermal cutting tooling between said tool mounting means and said storage component and wherein said control means controls the operations of said tool changing assembly to effect such transferring of tooling to selectively enable punching and plasma cutting of a workpiece.

29. The machine in accordance with either of claims 27 or 28 wherein said conduit means includes a high voltage transmission conduit and gas conduit.

30. The machine in accordance with claim 29 wherein there is included a source of water and conduit means for coupling between said source of water and said plasma cutting head.

31. The machine in accordance wih claim 30 wherein there is included means for removing water from the surface of the workpiece.

* * * * *

UNITED STATES PATENT AND TRADEMARK OFFICE
CERTIFICATE OF CORRECTION

PATENT NO. : 4,698,480

DATED : October 6, 1987

INVENTOR(S) : Hans Klingel

It is certified that error appears in the above-identified patent and that said Letters Patent is hereby corrected as shown below:

Column 17, line 42, "wih" should be "with"

Column 19, line 29, "wih" should be "with"

Column 19, line 53, "wih" should be "with"

Column 19, line 57, "wih" should be "with"

Column 20, line 39, "sais" should be "said"

Column 20, line 64, "wih" should be "with"

Signed and Sealed this

Tenth Day of May, 1988

*Attest:*

DONALD J. QUIGG

*Attesting Officer*  *Commissioner of Patents and Trademarks*